US012695326B2

(12) United States Patent
Li

(10) Patent No.: US 12,695,326 B2
(45) Date of Patent: Jul. 28, 2026

(54) CONTROL SYSTEM AND CONTROL METHOD FOR CONTROLLING ELECTRICAL APPARATUS

(71) Applicant: ZHEJIANG LITHELI TECHNOLOGY CO., LTD., Ningbo (CN)

(72) Inventor: Bin Li, Ningbo (CN)

(73) Assignee: ZHEJIANG LITHELI TECHNOLOGY CO., LTD., Ningbo (CN)

( * ) Notice: Subject to any disclaimer, the term of this patent is extended or adjusted under 35 U.S.C. 154(b) by 366 days.

(21) Appl. No.: 18/496,956

(22) Filed: Oct. 30, 2023

(65) Prior Publication Data

US 2024/0055893 A1 Feb. 15, 2024

Related U.S. Application Data

(63) Continuation of application No. PCT/CN2022/090125, filed on Apr. 29, 2022.

(30) Foreign Application Priority Data

Apr. 30, 2021 (CN) .......................... 202110479516.9
Sep. 28, 2021 (CN) .......................... 202111144848.8

(Continued)

(51) Int. Cl.
*H02J 13/13* (2026.01)
*H02J 7/00* (2006.01)
(52) U.S. Cl.
CPC .......... *H02J 13/1335* (2026.01); *H02J 7/855* (2026.01)

(58) Field of Classification Search
CPC .............. H02J 13/00026; H02J 7/0063; H02J 7/00032; H02J 7/00034; H02J 7/34;
(Continued)

(56) References Cited

U.S. PATENT DOCUMENTS

| 2016/0349779 A1* | 12/2016 | Fan ..................... H04L 12/2809 |
| 2017/0264979 A1* | 9/2017 | Masuda ................ H04W 4/021 |
| 2022/0085615 A1* | 3/2022 | Moehlen ........... H02J 13/00004 |

* cited by examiner

*Primary Examiner* — Zhipeng Wang
(74) *Attorney, Agent, or Firm* — Hemisphere Law, PLLC

(57) ABSTRACT

The present application discloses a control system and a control method for controlling an electrical apparatus. The control system includes a mobile communication device, an energy storage power supply, an intelligent power supply and an electrical apparatus. The mobile communication device is in wireless communication connection with the energy storage power supply; the energy storage power supply is in wireless communication connection with the intelligent power supply; the intelligent power supply is configured to supply electric energy to the electrical apparatus; The mobile communication device is configured to receive a control instruction input by a user and used for controlling the electrical apparatus. The energy storage power supply is configured to forward the control instruction. The intelligent power supply is configured to receive the control instruction forwarded by the energy storage power supply and control the electrical apparatus according to the control instruction. The intelligent power supply can wirelessly communicate with the cloud or the mobile communication device, that is the intelligent power supply has a networked communication function, the control of the intelligent power supply is more intelligent, and the user experience is improved.

10 Claims, 13 Drawing Sheets

(30)        Foreign Application Priority Data

| Sep. 28, 2021 | (CN) | ........................... 202111144887.8 |
|---|---|---|
| Oct. 22, 2021 | (CN) | ........................ 202111235878.X |
| Oct. 22, 2021 | (CN) | ........................ 202111235883.0 |
| Nov. 1, 2021 | (CN) | ........................ 202111283178.8 |

(58) Field of Classification Search
CPC .. H02J 13/00022; H02J 3/14; H02J 13/00032;
                    H04L 12/66; H04L 67/125
See application file for complete search history.

CONTROL SYSTEM AND CONTROL METHOD FOR CONTROLLING ELECTRICAL APPARATUS

TECHNICAL FIELD

The present application relates to a control system for controlling an electrical apparatus, and further relates to a control method for controlling an electrical apparatus.

BACKGROUND

Most traditional power supplies for supplying electric energy to an electrical apparatus are batteries or battery groups. For example, most traditional battery packs for gardening tools or household cleaning tools do not have the networked communication function, so that users need to manually operate to control on-off of the battery packs, the traditional battery packs are not intelligent in application, and the traditional lithium power supply cannot meet intelligent demands in life especially in outdoor leisure scenes.

SUMMARY

The present application provides a control system and a control method for controlling an electrical apparatus.

Specifically, the present application is implemented by means of following technical solutions.

The present application provides a control system for controlling an electrical apparatus. The control system includes: a mobile communication device, an energy storage power supply, an intelligent power supply and an electrical apparatus. The mobile communication device is in wireless communication connection with the energy storage power supply; the energy storage power supply is in wireless communication connection with the intelligent power supply; and the intelligent power supply is configured to supply electric energy to the electrical apparatus. The mobile communication device is configured to receive a control instruction for controlling the electrical apparatus input by a user; the energy storage power supply is configured to forward the control instruction; and the intelligent power supply is configured to receive the control instruction forwarded by the energy storage power supply and control the electrical apparatus according to the control instruction.

The present application further provides a control method for controlling an electrical apparatus. The control method is applied to the energy storage power supply in the control system for controlling an electrical apparatus, and includes: receiving a control instruction sent by the mobile communication device through wireless communication connection; and sending the control instruction to the intelligent power supply to enable the intelligent power supply to control the electrical apparatus according to the control instruction.

According to the technical solution provided by embodiments of the present application, the intelligent power supply can wirelessly communicate with a cloud or the mobile communication device, that is, the intelligent power supply has a networked communication function, so that the user can remotely control the intelligent power supply to start or shut off the electrical apparatus, the control of the intelligent power supply is more intelligent, and the user experience is improved. Certainly, the control instruction can also be forwarded through the energy storage power supply to further lengthen the communication distance.

It needs to be understood that, the above general description and the following detailed description are merely exemplary and explanatory, and cannot limit the present application.

BRIEF DESCRIPTION OF THE DRAWINGS

The drawings, which are incorporated in and constitute a part of the specification, illustrate embodiments consistent with the present disclosure and, together with the specification, serve to explain the principles of the present application.

DETAILED DESCRIPTION

Exemplary embodiments will be described in detail here, and instances thereof are shown in the accompanying drawings. The following description refers to the accompanying drawings in which the same numbers in different figures represent the same or similar elements unless otherwise indicated. Implementations set forth in the following description of exemplary embodiments do not represent all implementations consistent with the present application. Instead, the implementations are merely examples of apparatuses and methods consistent with some aspects of the embodiments of the present application as detailed in the appended claims.

The terms used in the present application are merely for describing specific embodiments, rather than limiting the embodiments of the present application. The terms "a/an", "said" and "the" in the singular form used in the present application and the appended claims are also intended to include the plural forms, unless otherwise clearly indicated in the context. It is to be further understood that the term "and/or" used herein refers to and includes any of one or more of the associated listed items or all possible combinations.

It should be understood that although the terms "first", "second", "third", and the like may be used in the embodiments of the present application to describe all types of information, the information is not limited to the terms. The terms are merely used to distinguish the same type of information from each other. For example, without departing from the scope of the embodiments of the present application, the first information may also be referred to as second information, and similarly, the second information may also be referred to as first information. Depending on the context, the word "if" as used here may be interpreted as "when" or "upon" or "in response to determining".

It is to be noted that the embodiments and features in the embodiments of the present invention may be combined with each other without conflict.

Figure 1A:
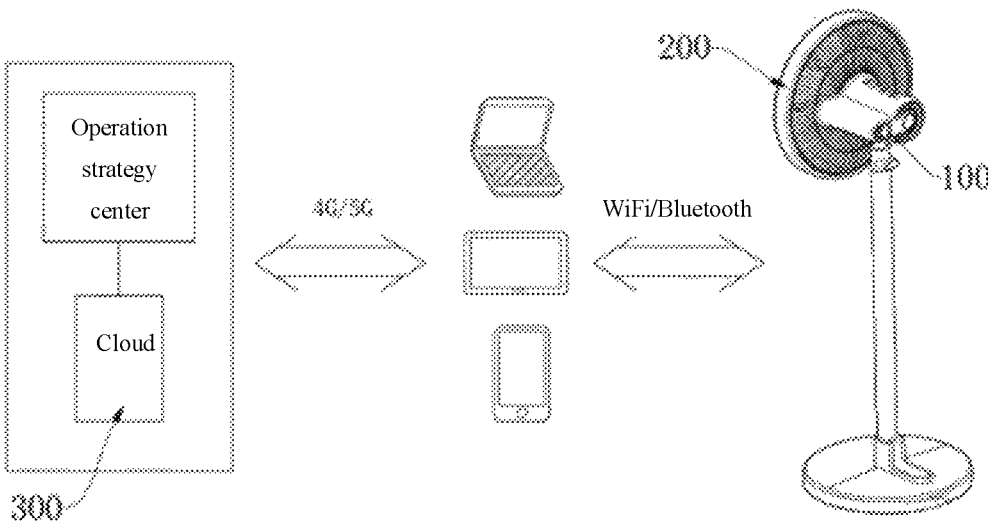
FIG. 1a is a schematic diagram illustrating a control system for controlling an electrical apparatus provided by an embodiment of the present application.
Figure 1B:
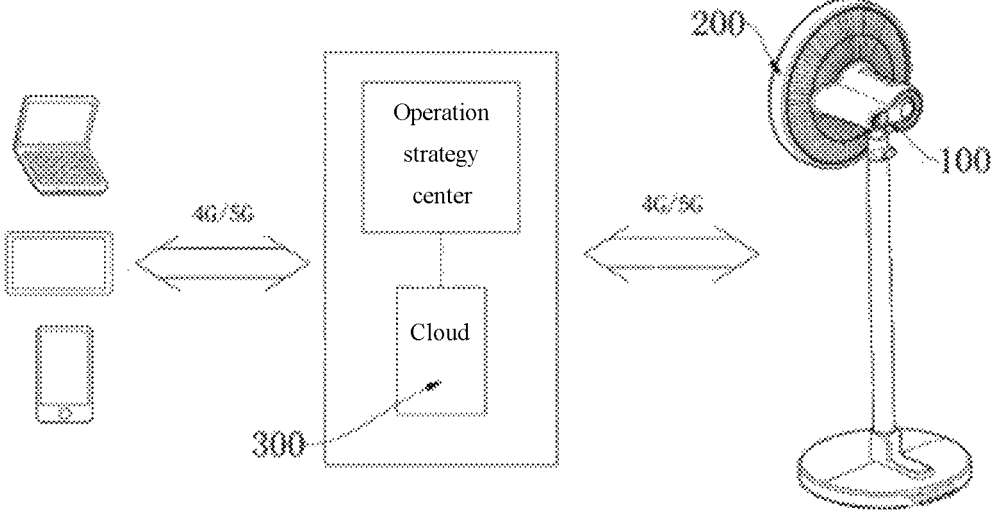
FIG. 1b is a schematic diagram illustrating another control system for controlling an electrical apparatus provided by an embodiment of the present application; and at the moment, a control instruction is forwarded through a cloud.

Referring to a control system for controlling an electrical apparatus (or called a power consuming apparatus) as shown in FIGS. 1a and 1b, the control system includes:

a mobile communication device configured for a user to input control instruction information;

a cloud 300 configured to store uploaded information and forward the instruction information; and an intelligent terminal configured to receive the instruction information sent by/from the mobile communication device and execute a control instruction to realize a corresponding control operation.

The intelligent terminal includes an intelligent power supply 100 and an electrical apparatus 200; and the intelligent power supply 100 is configured to supply electric energy to the electrical apparatus 200.

In some embodiments, as shown in FIG. 1a, the intelligent terminal is in wireless communication connection with/to the mobile communication device directly; the mobile communication device is in wireless communication connection with the cloud 300; the intelligent terminal receives the instruction sent by the mobile communication device, confirms the instruction and then executes the instruction; at the same time, the intelligent power supply feeds back status information to the mobile communication device; and the mobile communication device receives the status information and uploads it to the cloud, and then the cloud stores the status information.

For example, the intelligent terminal is in a wireless fidelity (WiFi) network covering environment, such as in an indoor home environment, the intelligent terminal is connected to the home WiFi network through a WiFi communication module, and a user is also in the WiFi network covering environment and can be connected to the WiFi network through a WiFi communication module in a mobile phone to realize wireless communication with the intelligent terminal.

At the moment, the user sends a power supply starting instruction to the intelligent power supply of a fan via the mobile communication device through the WiFi network; and the intelligent power supply of the fan receives the power supply starting instruction, confirms a control instruction and then controls the intelligent power supply to start the fan.

In another embodiments, as shown in FIG. 1b, the intelligent terminal is in wireless communication connection with the cloud; the cloud is in wireless communication connection with the mobile communication device; the mobile communication device receives an instruction sent by the user and then sends the instruction to the cloud; the intelligent power supply of the intelligent terminal receives instruction information forwarded from the cloud, confirms a control instruction, and then the intelligent power supply controls the electrical apparatus; and at the same time, the intelligent power supply uploads status information to the cloud for storage, at the moment, a user can control on-off of the intelligent terminal remotely and can also adjust a parameter of the intelligent terminal remotely. The control system forwards the control instruction through the cloud to lengthen a communication distance between the mobile communication device and the intelligent terminal.

For example, the intelligent terminal is in a WiFi network covering environment, such as in an indoor home environment, the intelligent terminal is connected to the home WiFi network through a WiFi communication module, the home WiFi network and the cloud realize wireless communication, a mobile phone is also connected to the home WiFi network, and at the same time, a user can realize wireless communication with the cloud through cellular data of the mobile phone, such as 4G or 5G signals.

At the moment, the user sends a power supply starting instruction to the cloud 300 via the mobile communication device through a wireless network; the cloud 300 sends the power supply starting instruction through the wireless network; the intelligent power supply receives the power supply starting instruction, confirms a control instruction and controls the electrical apparatus to start, and at the same time, the intelligent power supply uploads status information to the cloud.

Give another example, a user carries the intelligent power supply of the intelligent terminal outdoors, there is no WiFi network coverage, the intelligent power supply of the intelligent terminal is connected to the cloud 300 through cellular modules, such as a 4G or 5G communication module, and the user realizes wireless communication connection with the cloud 300 through cellular data of a mobile phone, such as 4G or 5G signals.

At the moment, the user sends a power supply starting instruction to the cloud 300 via the mobile communication device through a 4G or 5G network; the cloud 300 sends the power supply starting instruction through the 4G or 5G network; the intelligent terminal receives the power supply starting instruction and controls the intelligent power supply to start the electrical apparatus, and at the same time, the intelligent power supply uploads status information to the cloud through the 4G or 5G network for storage.

Figure 2A:
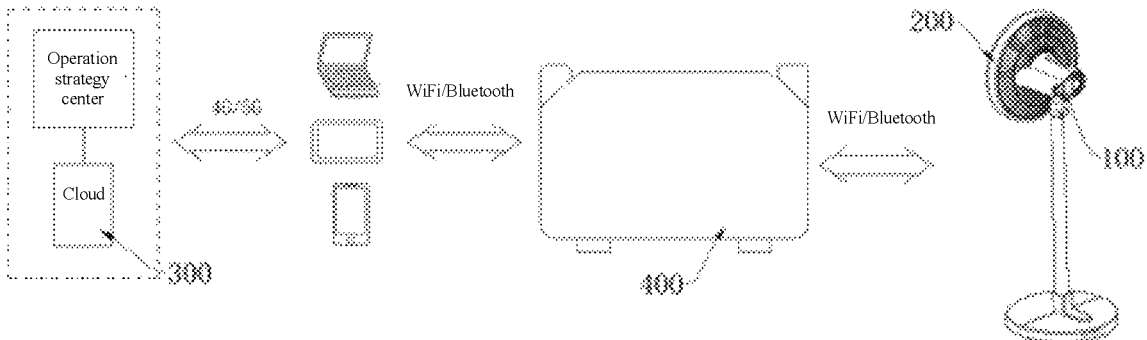
FIG. 2a is a schematic diagram illustrating another control system for controlling an electrical apparatus provided by an embodiment of the present application; and at the moment, a control instruction is forwarded through an energy storage power supply.
Figure 2B:
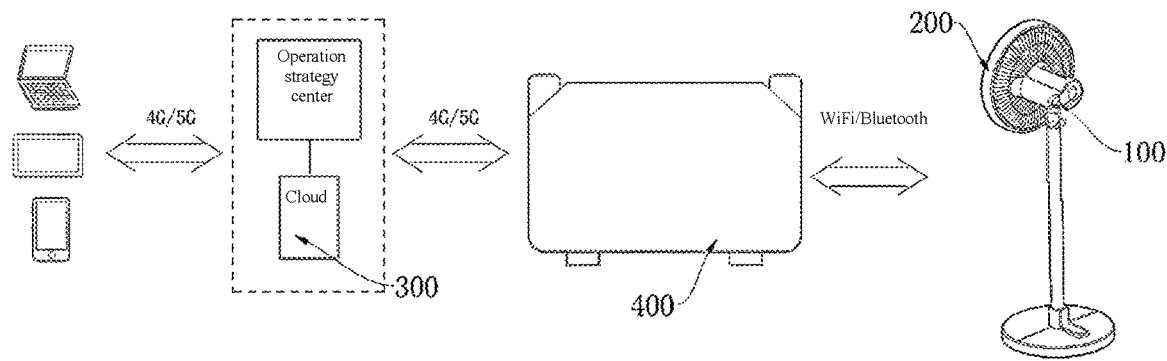
FIG. 2b is a schematic diagram illustrating another control system for controlling an electrical apparatus provided by an embodiment of the present application; and at the moment, a control instruction is forwarded through a cloud and an energy storage power supply.

FIG. 2a and FIG. 2b are schematic diagrams illustrating another control system for controlling an electrical apparatus according to another exemplary embodiment of the present application. The control system for controlling the electrical apparatus forwards a control instruction through an energy storage power supply, can lengthen a communication distance between a mobile communication device and an intelligent terminal, and includes:

a mobile communication device configured for a user to input control instruction information;

a cloud 300 configured to store uploaded information and forward the instruction information;

an energy storage power supply 400 configured to forward the instruction information; and an intelligent terminal configured to receive the instruction information sent by the mobile communication device and execute a control instruction to realize a corresponding control operation.

The intelligent terminal includes an intelligent power supply 100 and an electrical apparatus 200; and the intelligent power supply 100 is configured to supply electric energy to the electrical apparatus 200.

In some embodiments, as shown in FIG. 2a, the mobile communication device is in wireless communication connection with the cloud; at the same time, the mobile communication device is in wireless communication connection with the energy storage power supply; the energy storage power supply is in wireless communication with the intelligent power supply of the intelligent terminal; the intelligent power supply receives the instruction forwarded by the energy storage power supply and confirms the control instruction; at the same time, the intelligent power supply sends status information to the energy storage power supply; the energy storage power supply sends the status information to the mobile communication device after receiving it; and the mobile communication device uploads the status information to the cloud, and then the cloud stores the status information.

For example, a user carries the energy storage power supply and the intelligent power supply outdoors, there is no WiFi network coverage, the intelligent power supply is connected to the energy storage power supply through non-cellular modules, such as a WiFi or Bluetooth communication module, the energy storage power supply is connected to the mobile communication device through the non-cellular modules, such as the WiFi or Bluetooth communication module, and the user realizes wireless communication with the cloud 300 through cellular data of a mobile phone, such as 4G or 5G signals.

At the moment, the user sends a power supply starting instruction to the energy storage power supply via the mobile communication device through a WiFi network or Bluetooth; the energy storage power supply forwards information about the power supply starting instruction through the WiFi or Bluetooth network; and the intelligent power supply of a fan confirms a control instruction after receiving the power supply starting instruction, so as to start the fan.

In another embodiments, as shown in FIG. 2*b*, the intelligent power supply is in wireless communication connection with the energy storage power supply; the energy storage power supply is in wireless communication connection with the cloud; the cloud is in wireless communication connection with the mobile communication device; the mobile communication device receives an instruction sent by a user and then sends the instruction to the cloud; the cloud sends instruction information to the energy storage power supply; the intelligent power supply receives the instruction information forwarded from the energy storage power supply, confirms the instruction, and then executes the control instruction; and at the same time, the intelligent power supply uploads status information to the cloud for storage via the energy storage power supply.

For example, the user carries the energy storage power supply and the intelligent power supply outdoors, there is no WiFi network coverage, the intelligent power supply is connected to the energy storage power supply through non-cellular modules, such as a WiFi or Bluetooth communication module, the energy storage power supply is connected to the cloud 300 through cellular modules, such as a 4G or 5G communication module, and the user realizes wireless communication with the cloud 300 through cellular data of a mobile phone, such as 4G or 5G signals.

At the moment, the user sends a power supply starting instruction to the cloud 300 via the mobile communication device through a 4G or 5G network; the cloud 300 sends the power supply starting instruction to the energy storage power supply through the 4G or 5G network; and the intelligent terminal receives the power supply starting instruction forwarded from the energy storage power supply, confirms the instruction and controls the intelligent power supply to start the electrical apparatus.

Figure 3:
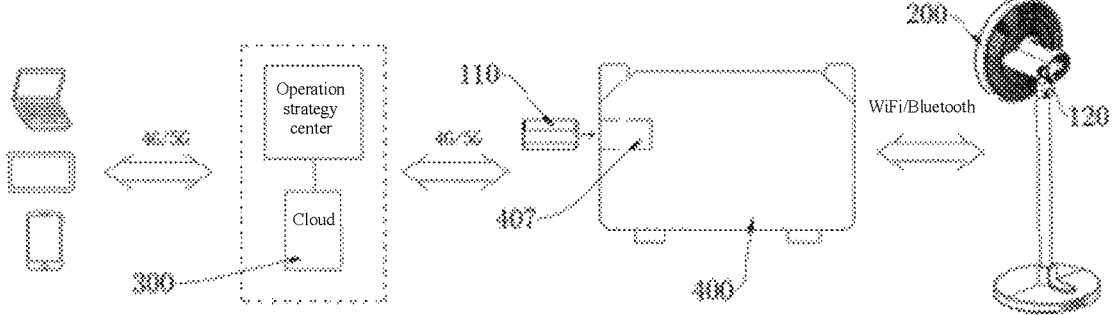
FIG. 3 is a schematic diagram illustrating another control system for controlling an electrical apparatus provided by an embodiment of the present application; and at the moment, when a first intelligent power supply is electrically connected with an energy storage power supply, a cellular communication module of the first intelligent power supply or the energy storage power supply is activated.

FIG. 3 is a schematic diagram illustrating another control system for controlling an electrical apparatus according to another exemplary embodiment of the present application; and at the moment, when a first intelligent power supply 110 is electrically connected with an energy storage power supply 400, a cellular communication module of the first intelligent power supply 110 or the energy storage power supply 400 is activated; and the control system includes:

a mobile communication device configured for a user to input control instruction information;

a cloud 300 configured to store uploaded information and forward the instruction information;

an energy storage power supply 400 configured to forward the instruction information;

a first intelligent power supply 110 configured to provide a wireless network; and an intelligent terminal configured to receive and execute a control instruction.

The mobile communication device is in wireless communication connection with the cloud 300; the first intelligent power supply 110 or the energy storage power supply 400 is in wireless communication with the cloud; and the intelligent terminal receives the control instruction information forwarded from the first intelligent power supply 110 or the energy storage power supply 400 and executes the instruction.

The intelligent terminal includes a second intelligent power supply 120 and an electrical apparatus 200; and the second intelligent power supply 120 is configured to supply electric energy to the electrical apparatus 200.

The first intelligent power supply 110 or the energy storage power supply 400 is configured with a cellular communication module (such as 2G/3G/4G/5G/narrow band internet of things (NB-IOT)/long term evolution machine (LTE-M)); when the first intelligent power supply 110 is electrically connected with the energy storage power supply 400, the cellular communication module of the first intelligent power supply 110 or the energy storage power supply 400 is activated, and at the moment, the first intelligent power supply 110 or the energy storage power supply 400 is in wireless communication connection with the cloud through a wireless cellular network; specifically, the energy storage power supply 400 includes a mounting part 407 suitable for being electrically connected with the first intelligent power supply 110; the first intelligent power supply 110 is mounted on the mounting part 407 in an adaptive manner, and at the moment, the first intelligent power supply 110 and the energy storage power supply 400 realize both positioning installation connection and electric connection; and more specifically, the mounting part includes an electric terminal electrically matched with an electric terminal of the first intelligent power supply 110, and at the moment, a control unit of the first intelligent power supply 110 or the energy storage power supply 400 detects an adaptive electric signal of the intelligent power supply 110 and the energy storage power supply 400 to activate a wireless cellular communication function of the energy storage power supply 400 or the first intelligent power supply 110.

Or the first intelligent power supply 110 and the energy storage power supply 400 realize both positioning installation connection and signal connection; and more specifically, the mounting part includes a signal terminal in electric signal connection with a signal terminal of the first intelligent power supply 110; when the two signal terminals are mounted and connected in an adaptive manner, they are exchanged and connected through identifying the signals to activate the wireless cellular communication function of the energy storage power supply 400 or the first intelligent power supply 110.

The first intelligent power supply 110 or the energy storage power supply 400 is configured with a non-cellular communication module (such as WiFi/Bluetooth/ZigBee/long range radio (Lora)/Sigfox), and at the moment, the first intelligent power supply 110 or the energy storage power supply 400 wirelessly communicates with the second intelligent power supply through a non-cellular network to forward the control instruction.

Preferably, the first intelligent power supply 110 includes both a cellular communication module (such as 2G/3G/4G/5G/NB-IOT/LTE-M) and a non-cellular communication module (such as WiFi/Bluetooth/ZigBee/Lora/Sigfox), and the first intelligent power supply 110 can be used as a mobile WiFi device.

For example, a user carries the energy storage power supply 400 and first intelligent power supply 110 outdoors, there is no WiFi network coverage, the first intelligent power supply 110 is mounted and connected to the energy storage power supply 400, the wireless cellular communication function of the first intelligent power supply 110 is activated, then the activated first intelligent power supply 110 is connected to the cloud 300 through the cellular communication module such as a 4G or 5G communication module, the second intelligent power supply 120 is connected to the first intelligent power supply 110 with the activated wireless cellular communication function through the non-cellular communication module such as a WiFi or Bluetooth communication module, and the user realizes wireless communication with the cloud 300 through cellular data of a mobile phone, such as 4G or 5G signals.

At the moment, the user sends a power supply starting instruction to the cloud 300 via the mobile communication device through a wireless network; the cloud 300 sends the power supply starting instruction through the wireless network; the first intelligent power supply 110 with the activated wireless cellular communication function sends the power supply starting instruction to the second intelligent power supply 120 through the wireless network connected; and a control unit of the second intelligent power supply 120 receives the power supply starting instruction through the wireless network connected and controls the fan powered by the second intelligent power supply 120 to start.

Figure 4A:
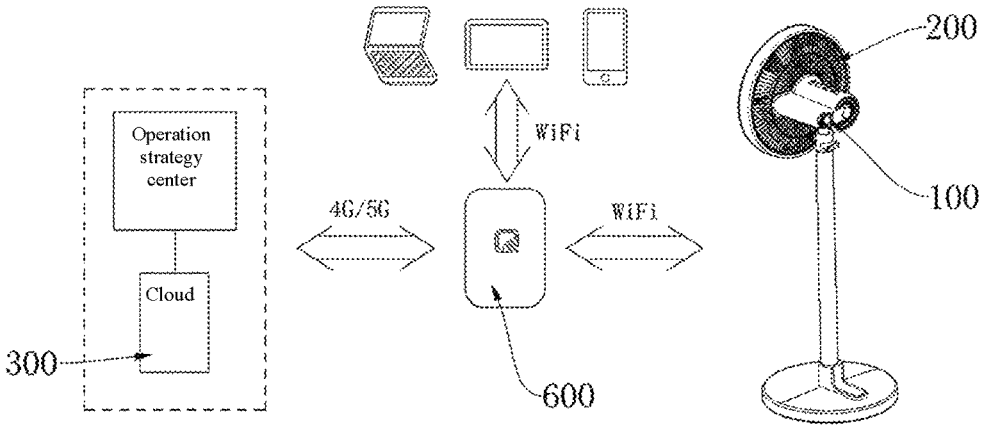
FIG. 4a is a schematic diagram illustrating another control system for controlling an electrical apparatus provided by an embodiment of the present application; and at the moment, a mobile communication device and an intelligent power supply are within a WiFi network coverage range of a mobile WiFi device.
Figure 4B:
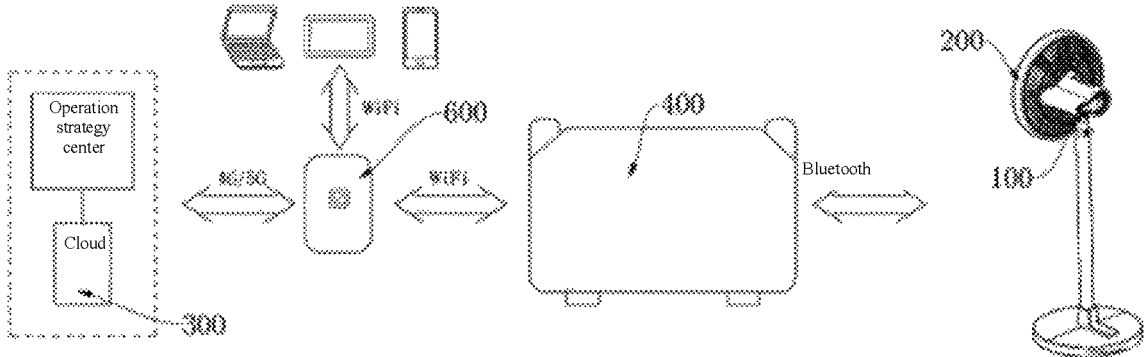
FIG. 4b is a schematic diagram illustrating another control system for controlling an electrical apparatus provided by an embodiment of the present application; and at the moment, a mobile communication device and an energy storage power supply are within a WiFi network coverage range of a mobile WiFi device.

FIG. 4a and FIG. 4b are schematic diagrams illustrating another control system for controlling an electrical apparatus according to another exemplary embodiment of the present application. The control system is applicable to a scene without a local area network (LAN), especially to an outdoor environment, and the control system includes:

a mobile communication device configured for a user to input control instruction information;

a mobile WiFi device 600 configured to provide a WiFi network; and an intelligent terminal configured to receive the instruction information and execute the control instruction.

The intelligent terminal includes an intelligent power supply 100 and an electrical apparatus 200; and the intelligent power supply 100 is configured to supply electric energy to the electrical apparatus 200.

In some embodiments, as shown in FIG. 4a, the intelligent terminal is in WiFi network coverage of the mobile WiFi device; the mobile communication device is also connected to the WiFi network of the mobile WiFi device, and at the moment, the intelligent power supply of the intelligent terminal can wirelessly communicate with the mobile communication device through the WiFi network to receive, confirm and execute the control instruction.

At the moment, the control system further includes a cloud 300 configured to store status information uploaded by the intelligent terminal; and the mobile WiFi device is in wireless communication connection with the cloud through its own cellular data such as 4G/5G data.

For example, a user carries the mobile WiFi device and the intelligent power supply outdoors, the mobile communication device and the intelligent power supply are in the WiFi network coverage of the mobile WiFi device, and the mobile communication device wirelessly communicates with the intelligent power supply through the WiFi network.

At the moment, the user sends a power supply starting instruction to the intelligent power supply via the mobile communication device through the WiFi network; and the intelligent power supply receives the power supply starting instruction, confirms the instruction, and i starts the electrical apparatus.

In another embodiments, as shown in FIG. 4b, the control system further includes an energy storage power supply; the energy storage power supply is in the network coverage of the mobile WiFi device; the mobile communication device is also connected to the WiFi network of the mobile WiFi device, and at the moment, the energy storage power supply can wirelessly communicate with the mobile communication device through the WiFi network; the intelligent power supply of the intelligent terminal is connected to the energy storage power supply through a non-cellular communication module such as a Bluetooth communication module to receive and execute the control instruction; the energy storage power supply also includes a gateway module to convert a Bluetooth signal and a WiFi signal; and at the moment, the intelligent power supply can still receive the control instruction forwarded by the energy storage power supply to lengthen a communication distance even if it is not in the network coverage of the mobile WiFi device, namely beyond the network coverage of the mobile WiFi device.

At the moment, the control system further includes a cloud 300 configured to store status information uploaded by the intelligent terminal; and the mobile WiFi device is in wireless communication connection with the cloud through its own cellular data such as 4G/5G data.

For example, a user carries the mobile WiFi device, the energy storage power supply and the intelligent power supply outdoors, the mobile communication device and the intelligent power supply are in the WiFi network coverage of the mobile WiFi device, the mobile communication device wirelessly communicates with the energy storage power supply through the WiFi network, and the intelligent power supply wirelessly communicates with the energy storage power supply through its own Bluetooth module.

At the moment, the user sends a power supply starting instruction to the energy storage power supply via the mobile communication device through the WiFi network; the energy storage power supply converts a WiFi signal of the instruction into a Bluetooth signal and sends the instruction to the intelligent power supply through the Bluetooth module; and the intelligent power supply receives and confirms the power supply starting instruction and is controlled to start the electrical apparatus.

Figures 5, 6A:
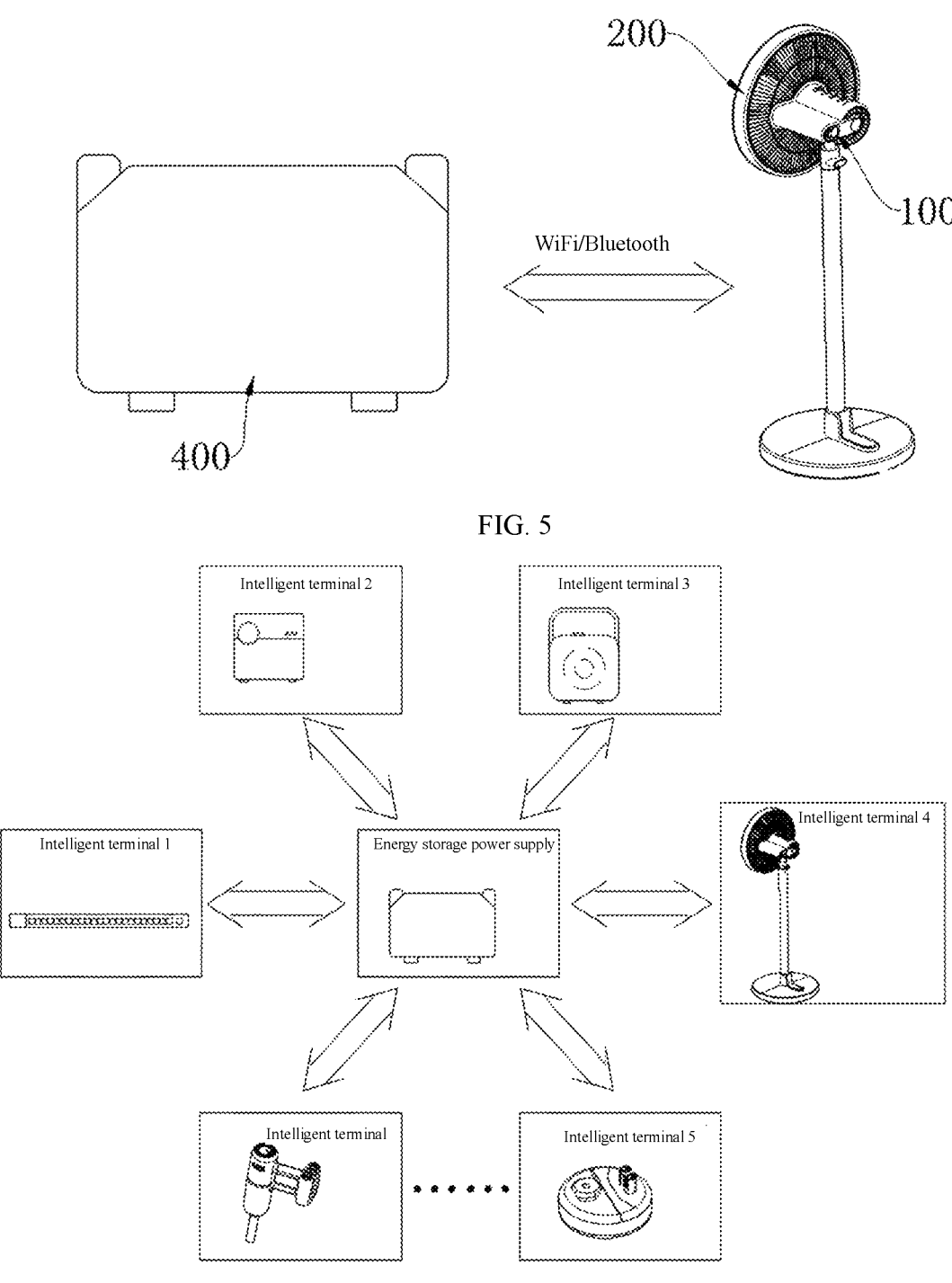
FIG. 5 is a schematic diagram illustrating another control system for controlling an electrical apparatus provided by an embodiment of the present application.
FIG. 6a is a schematic diagram illustrating an energy storage power supply controlling multiple intelligent power supplies simultaneously in an indoor environment provided by an embodiment of the present application.

FIG. 5 is a schematic diagram illustrating another control system for controlling an electrical apparatus according to another exemplary embodiment of the present application. The control system for controlling the electrical apparatus is applied in an environment without an external network, at the moment, an energy storage power supply receives instruction information input by a user, and the control system for controlling the electrical apparatus includes:

an energy storage power supply 400 configured to send instruction information to an intelligent terminal; and the intelligent terminal configured to receive the instruction information sent by the mobile communication device and execute a control instruction to realize a corresponding control operation.

The intelligent terminal includes an intelligent power supply 100 and an electrical apparatus 200; and the intelligent power supply 100 is configured to supply electric energy to the electrical apparatus 200.

As shown in FIG. 5, the energy storage power supply 400 is in wireless communication connection with the intelligent power supply through its own non-cellular wireless communication module to control the electrical apparatus electrically connected with the intelligent power supply; the energy storage power supply receives the instruction information of the user through its own input apparatus, and sends the instruction information to the intelligent power supply of the intelligent terminal; and after receiving the instruction, the intelligent power supply executes the instruction and realizes the corresponding operation.

For example, the user can give a sweeping robot starting control instruction to the energy storage power supply through a voice instruction; after receiving the instruction, the energy storage power supply sends it to the intelligent power supply of a sweeping robot; and the intelligent power supply receives and confirms the control instruction, and then the intelligent power supply controls the sweeping robot to start.

The processing logic for controlling the electrical apparatus is cached in the energy storage power supply and maintained by the energy storage power supply; and when a network is available, the processing logic can be sent into the energy storage power supply for updating through a wireless network.

In some embodiments, the control system for controlling the electrical apparatus is also applicable to scene linkage, that is, the energy storage power supply 400 can send the control instruction to the intelligent terminal after searching a preset triggering condition.

For example, when a preset timing is reached, the energy storage power supply sends the sweeping robot starting instruction to the intelligent power supply of the sweeping robot; after receiving the instruction, the intelligent power supply of the sweeping robot confirms the instruction and carries out the corresponding operation of the instruction to start the sweeping robot in a timed manner.

Figure 6B:
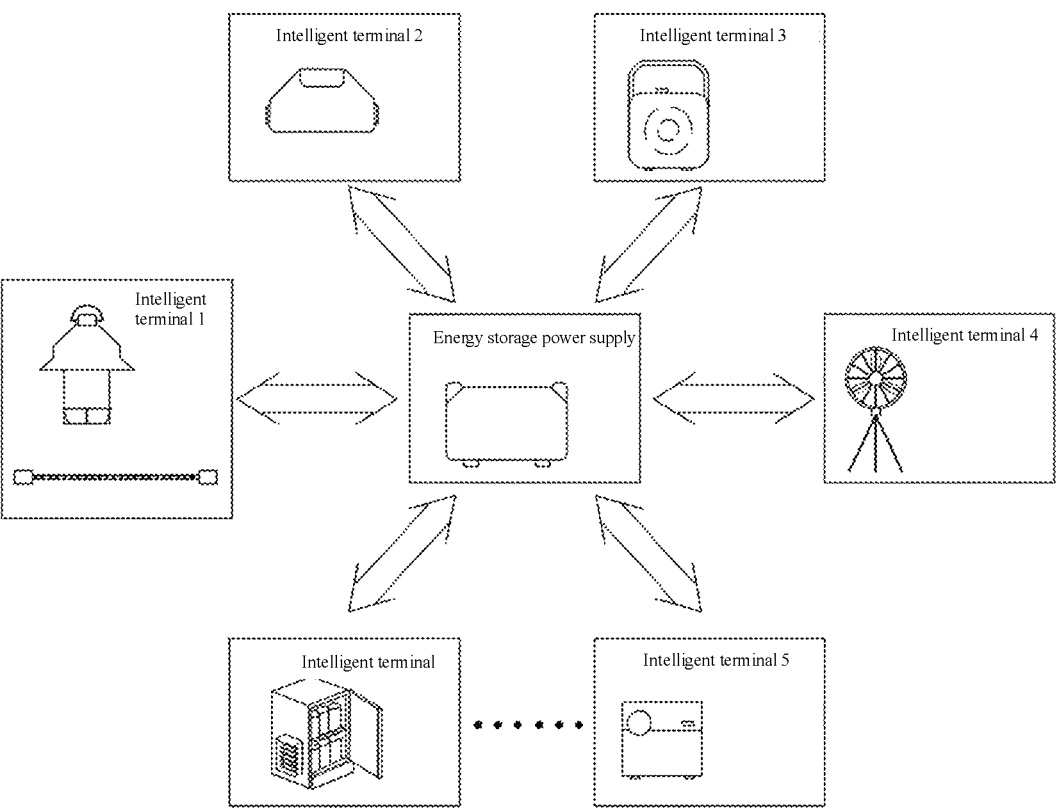
FIG. 6b is a schematic diagram illustrating an energy storage power supply controlling multiple intelligent power supplies simultaneously in an outdoor environment provided by an embodiment of the present application.

FIG. 6a and FIG. 6b are schematic diagrams illustrating an energy storage power supply controlling multiple intelligent terminals simultaneously according to an exemplary embodiment of the present application, that is, when there are multiple intelligent terminals in the control system, the energy storage power supply can simultaneously monitor multiple intelligent power supplies in wireless communication with the energy storage power supply.

In some embodiments, in an indoor environment, the energy storage power supply 400 can simultaneously control multiple intelligent terminals such as a sound, a projector, a cabinet light, a dust collector, a sweeping robot and a hair dryer; as shown in FIG. 6a, the energy storage power supply can be in wireless communication connection with multiple intelligent terminals simultaneously; after receiving a control instruction, the energy storage power supply forwards it to the intelligent power supply, which is in wireless communication connection with the energy storage power supply, of the intelligent terminal; for example, when the energy storage power supply 400 receives a sweeping robot starting instruction, the energy storage power supply 400 sends the instruction to the sweeping robot, and after receiving the instruction, the intelligent power supply of the sweeping robot controls the sweeping robot to turn on the power supply; and when the energy storage power supply 400 receives a fan air speed increasing instruction, the energy storage power supply 400 sends the instruction to the fan, after receiving the instruction, the intelligent power supply of the fan controls the fan to increase the fan air speed, that is controls the output voltage output to the fan by the intelligent power supply to increase.

In some embodiments, in an outdoor environment, the energy storage power supply 400 can simultaneously control multiple intelligent terminals such as a sound, a projector, a camping light, an outdoor fan, an outdoor air conditioner, that is the energy storage power supply 400 can be in wireless communication connection with multiple intelligent terminals such as the sound, the camping light and the like simultaneously; after receiving a control instruction, the energy storage power supply sends it to the intelligent power supply, as shown in FIG. 6b; for example, when the energy storage power supply 400 receives a camping light starting instruction, the energy storage power supply 400 forwards the instruction to the camping light, and after receiving the instruction, the intelligent power supply of the camping light is controlled to turn on the camping light; and when the energy storage power supply 400 receives a sound volume raising instruction, the energy storage power supply 400 forwards the instruction to the intelligent power supply of the sound, and after receiving the instruction, the intelligent power supply of the sound controls the sound to raise the volume.

In some embodiments, the control instruction is confirmed by the energy storage power supply, that is after receiving the control instruction, the energy storage power supply determines an intelligent terminal to execute the control instruction and sends the instruction to the corresponding intelligent terminal, and the corresponding intelligent terminal receives and executes the instruction.

Specifically, the method for determining an intelligent terminal to execute the instruction includes: when the energy storage power supply wirelessly communicates with all intelligent terminals, the energy storage power supply can number the intelligent terminals in communication connection with it according to a preset rule; the preset rule refers to that the intelligent terminals are classified according to their models and/or functions, and then arranged sequentially according to their own unique physical addresses; the numbers of the intelligent terminals can include letters, numbers and characters; for example, the intelligent terminals are first classified according to models; when there are multiple intelligent terminals of the same type, the intelligent terminals are sequentially arranged according to the physical addresses; and the number results and rules are stored in a storage module of the energy storage power supply to form a database.

For example, in the indoor environment, after receiving a dust collector starting control instruction, the energy storage power supply identifies the instruction, confirms the number of the intelligent terminal to execute the control instruction and sends the power supply starting instruction to the intelligent terminal of the corresponding number, namely a dust collector; and after receiving the instruction information, the intelligent power supply of the dust collector controls the dust collector to start.

In another embodiments, the control instruction is confirmed by the intelligent power supply, that is, after receiving the control instruction, the energy storage power supply forwards the instruction to all intelligent terminals in wireless communication connection with it; after the intelligent power supplies of the intelligent terminals receive the control instruction, each intelligent terminal determines whether to execute the instruction by itself, if yes, the intelligent terminal executes the instruction; otherwise, the intelligent terminal does not execute the instruction.

For example, in the outdoor environment, after receiving a camping light shutting control instruction, the energy storage power supply sends the control instruction to all intelligent terminals in wireless communication connection with it; the intelligent power supply of the sound receives the instruction, and determines that the instruction is not executed by itself, so that the instruction is not executed; while the intelligent power supply of the camping light receives the instruction, determines that the instruction is executed by itself, and determines that the instruction is to shut off the power supply, and after that, the intelligent power supply controls the camping light to turn off.

Figures 6C, 7A:
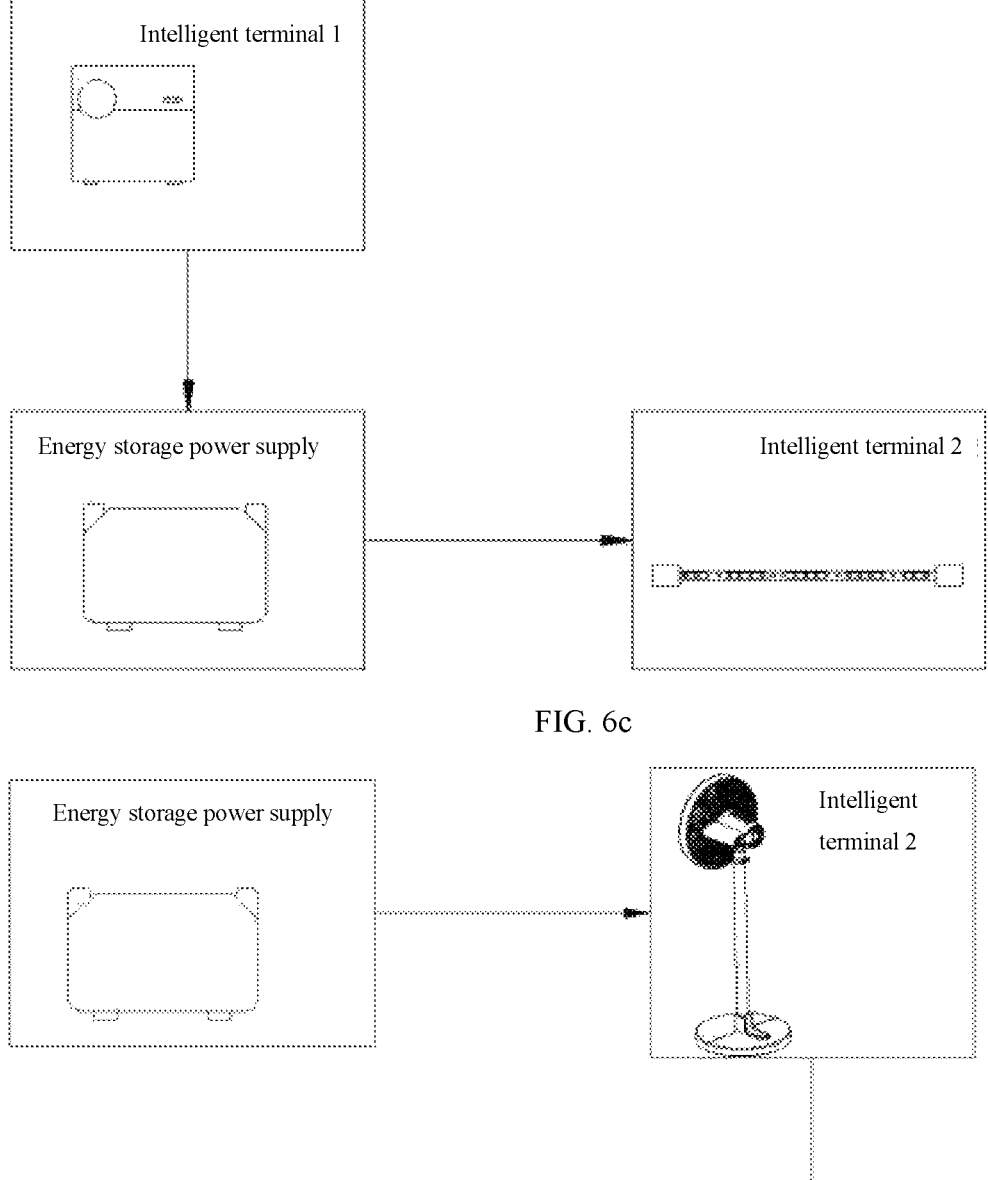
FIG. 6c is a schematic diagram illustrating a scene linkage among multiple intelligent terminals provided by an embodiment of the present application.
FIG. 7a is a schematic diagram illustrating another energy storage power supply controlling multiple intelligent power supplies provided by an embodiment of the present application; and at the moment, another intelligent power supply is arranged between the energy storage power supply and the intelligent power supply.

In some embodiments, scene linkage can also be formed between the multiple intelligent terminals and the energy storage power supply, that is, the intelligent terminal 1 triggers a preset triggering condition, the energy storage power supply receives information sent by the intelligent terminal 1 and sends the instruction to the intelligent terminal 2, and the intelligent terminal 2 receives and executes the instruction; and for example, when the projector has played for 20 minutes, the intelligent power supply of the projector sends information that a film has been played for 20 minutes to the energy storage power supply, after receiving the information, the energy storage power supply sends a line lamp starting control instruction to the intelligent power supply of a line lamp, and after receiving the instruction, the intelligent power supply of the line lamp controls the line lamp to turn on, as shown in FIG. 6c.

The triggering condition, executing action and a corresponding executing program can be stored in the energy storage power supply and are maintained by the energy storage power supply; and the executing program can be generated by a computility module (or called computing module) of the energy storage power supply according to the triggering condition and the executing action.

Figure 7B:
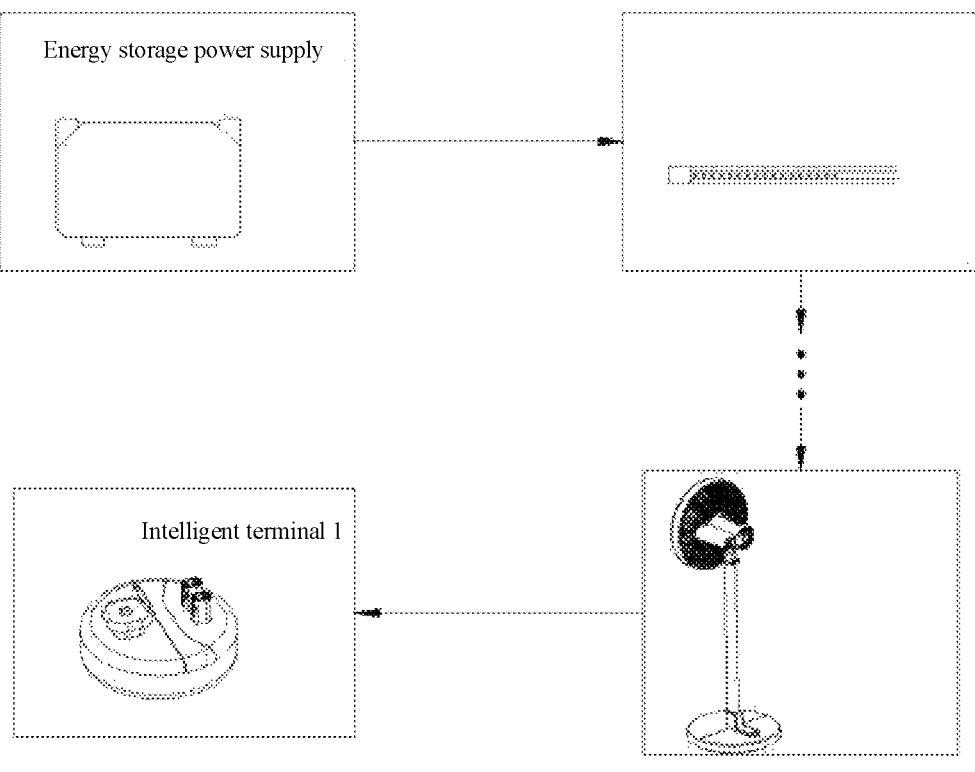
FIG. 7b is a schematic diagram illustrating another energy storage power supply controlling multiple intelligent power supplies provided by an embodiment of the present application; and at the moment, multiple intelligent power supplies are arranged between the energy storage power supply and the intelligent power supplies.

FIG. 7a and FIG. 7b are schematic diagrams illustrating another energy storage power supply controlling multiple intelligent terminals simultaneously according to another exemplary embodiment of the present application. At least one intelligent power supply of the intelligent terminals is arranged between the energy storage power supply and the intelligent terminal executing a control instruction and is configured to forward the control instruction information; and as shown in FIG. 7a, another intelligent power supply is arranged between the energy storage power supply and an intelligent power supply and is configured to forward the control instruction information.

Specifically, if the intelligent terminal 1 executing the instruction is beyond a communication range of the energy storage power supply, and the intelligent power supply of the intelligent terminal 2 is arranged between the energy storage power supply and the intelligent terminal 1, the energy storage power supply forwards the instruction of controlling the electrical apparatus of the intelligent terminal 1 to the intelligent power supply of the intelligent terminal 2; after receiving the control instruction, the intelligent power supply of the intelligent terminal 2 determines whether to execute the instruction by itself, if not, the intelligent power supply of the intelligent terminal 2 forwards the instruction information to the intelligent power supply of the intelligent terminal 1; and the intelligent power supply of the intelligent terminal 1 executes the control instruction after receiving it.

For example, the energy storage power supply is in wireless communication connection with the intelligent power supply of a fan through a non-cellular module such as WiFi or Bluetooth, the intelligent power supply of the fan is in wireless communication connection with the intelligent power supply of a sweeping robot through a non-cellular module such as WiFi or Bluetooth, at the moment, after receiving a sweeping robot power supply starting control instruction, the energy storage power supply sends the control instruction to the intelligent power supply of the fan; after receiving the control instruction, the intelligent power supply of the fan determines that the instruction is not executed by itself and forwards the sweeping robot power supply starting control instruction to the intelligent power supply of the sweeping robot; and after receiving the control instruction, the intelligent power supply of the sweeping robot confirms that the instruction is starting and controls the sweeping robot to start.

Certainly, in some embodiments, as shown in FIG. 7b, the intelligent power supplies of multiple intelligent terminals can be arranged between the energy storage power supply and the intelligent terminal 1, that is, the instruction for controlling the intelligent terminal 1 should be forwarded by the intelligent power supplies of multiple intelligent terminals to lengthen the communication distance.

In the above embodiments, the status information can include an operating parameter of the intelligent power supply and/or an operating parameter of the electrical apparatus, and further includes an operating parameter of the energy storage power supply; specifically, the operating parameter of the intelligent power supply can be one or more of a voltage parameter, a current parameter, a temperature parameter and a charge status parameter; the operating parameter of the electrical apparatus can be one or more of a working power parameter, a working mode parameter, a working time parameter, a position parameter and a temperature parameter; and the operating parameter of the energy storage power supply can be one or more of a voltage parameter, a current parameter, a temperature parameter and a charge status parameter. It is to be noted that the above descriptions are merely explanations through listing examples and are not limited to the above operating parameters.

In the above embodiments, the above control instruction can be starting or shutting off the power supply and can also be adjusting an output parameter; for example, when the intelligent terminal is an illuminating device, the on-off, light intensity, color temperature and illuminating duration of the illuminating device can be remotely controlled through the control system; and when the illuminating device is a fan, the on-off, air outlet volume and a mode of the fan can be remotely controlled through the control system.

Specifically, the above output parameter is one or more of output power, output time, an output current direction and an output mode. It is to be noted that the above descriptions are merely explanations through listing examples and are not limited to the above output parameters.

The above control instruction further includes automatically shutting the power supply, that is when the intelligent power supply and/or electrical apparatus becomes abnormal, the intelligent power supply controls the electrical apparatus to automatically shut; for example, when the temperature of the intelligent power supply of the fan becomes abnormal, the intelligent power supply stops supplying electric energy to the fan.

The above abnormity determining method includes: the intelligent power supply processes collected parameters to monitor whether operating status becomes abnormal; specifically, after collecting the parameters, the intelligent power supply carries out self-comparison and/or mutual comparison on the parameters and determines whether abnormity occurs according to the comparison result; if yes, the intelligent power supply controls the electrical apparatus to stop working; the self-comparison refers to comparison between currently collected parameters and previously stored parameters, and the mutual comparison refers to comparison between the currently collected parameters and preset threshold values.

At the moment, if the intelligent power supply does not become abnormal, the collected parameters are stored; if the currently collected parameters are consistent with the previously stored parameters, the recording time is modified to the current time; and if the currently collected parameters are not consistent with the previously stored parameters, the previous parameters are replaced with the current parameters, and at the same time, the recording time is modified to the current time, and the collected parameters are uploaded to a cloud.

For example, the collected parameters are voltage parameters outputted by the intelligent power supply to the electrical apparatus; a current voltage parameter is compared with a previously stored voltage parameter; if the current voltage parameter and the previously stored voltage parameter change, changing information is sent to the mobile communication device to inform the user that the voltage parameter of the intelligent power supply has changed, and the voltage parameter is stored; and at the same time, the current voltage parameter is compared with a preset voltage threshold value, if the current voltage parameter is higher or lower than the preset voltage threshold value, it indicates that abnormity occurs, the intelligent power supply stops supplying electric energy to the electrical apparatus according to the abnormity result and sends prompting information to the mobile communication device to inform the user.

Certainly, the intelligent power supply can also monitor its status information during charging, that is, the voltage, current and temperature of the intelligent power supply during charging are collected in real time and compared to determine whether abnormity occurs.

For example, the collected data is the temperature parameter of the intelligent power supply during charging; collected temperature data is compared with a preset temperature threshold value; if the current temperature exceeds the temperature threshold value, it indicates that abnormity occurs, the intelligent power supply stops charging according to the processing result and sends prompting information to the mobile communication device to inform the user.

According to some embodiments of the present application, the mobile communication device at least includes a communication apparatus, a processing apparatus and a memory; the communication apparatus is configured to send or receive a signal through a wired or wireless network; the processing apparatus includes an application processing part and a radio frequency/digital signal processor; the memory is configured to process or store signal in a physical storage status; and the mobile communication device is an intelligent user terminal such as a mobile phone, pad, notebook and the like.

According to some embodiments of the present application, the cloud is a server; and the server mentioned herein should be understood as a service point for providing processing, databases and communication facilities. For example, the server can be a single physical processor with relevant communication, data storage and database facilities, or it can be an aggregate of networked or clustered processors, relevant networks and storage devices, and carry out operations on software, one or more database systems, and applications (Apps) supporting services provided by the server. Servers differ greatly in terms of configuration or performance, but a server generally includes one or more central processing units and a memory. The server further includes one or more mass storage devices, one or more power supplies, one or more wired or wireless network interfaces, one or more input/output interfaces, or one or more operating systems such as Windows Server, Mac OS X, Unix, Linux, FreeBSD, etc.

The cloud can be an integral server or a distributed server crossing multiple computers or computer data centers. The server may be multiple types of servers and is not limited to a network/web server, a news server, a mail server, a message server, an advertisement server, a file server, an application server, an interaction server, a database server or a proxy server. In some embodiments, each server can include hardware, software, or an embedded logic assembly configured to execute proper functions supported or realized by the server, or a combination of two or more embedded logic assemblies. In the present application, the server is configured to provide all functions needed for supporting remote control of the intelligent power supply.

The cloud at least includes: one or more central processing units, one or more memories and/or a mass storage device, and one or more wired or wireless network interfaces.

According to some embodiments of the present application, the intelligent terminal includes:

an electrical apparatus 200; and an intelligent power supply 100 configured to be in wireless communication connection with the mobile communication device, the cloud or the energy storage power supply and to control the electrical apparatus 200.

The intelligent terminal further includes:

an actuator 900 which is configured to execute actions of the instruction and may be a circuit switch.

Figure 8:
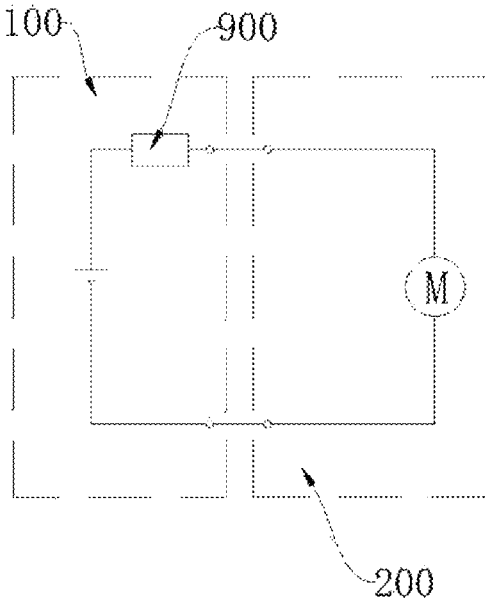
FIG. 8a is a schematic diagram illustrating a circuit containing an intelligent power supply and an electrical apparatus provided by an embodiment of the present application; and at the moment, an actuator is arranged on the intelligent power supply.
FIG. 8b is a schematic diagram illustrating a circuit containing an intelligent power supply and an electrical apparatus provided by an embodiment of the present application; and at the moment, an actuator is arranged on the electrical apparatus.

In some embodiments, as shown in FIG. 8a, the actuator 900 is arranged on the intelligent power supply 100, that is the intelligent power supply 100 is configured to execute the control instruction to realize the corresponding control operation on the electrical apparatus.

Figure 8B:
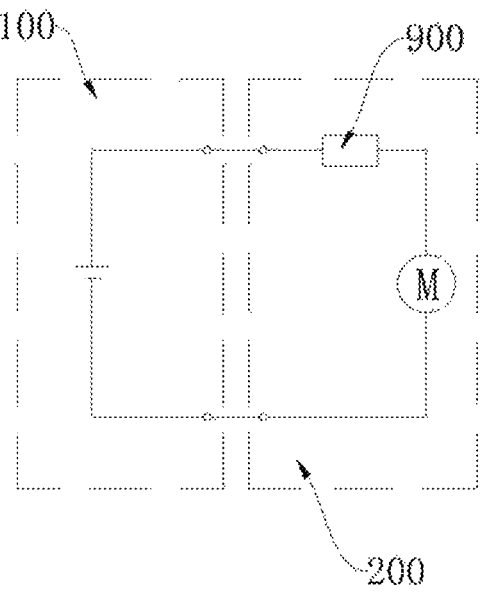

In another embodiments, as shown in FIG. 8b, the actuator 900 is arranged on the electrical apparatus 200, that is the control instruction is sent to the electrical apparatus, and the electrical apparatus is enabled to execute the control instruction to realize the corresponding control operation; and at the moment, the intelligent power supply and the electrical apparatus can realize communication connection through a communication interface or a wireless network such as a WiFi, Bluetooth, NFC and other short-distance wireless communication module.

Figure 9:
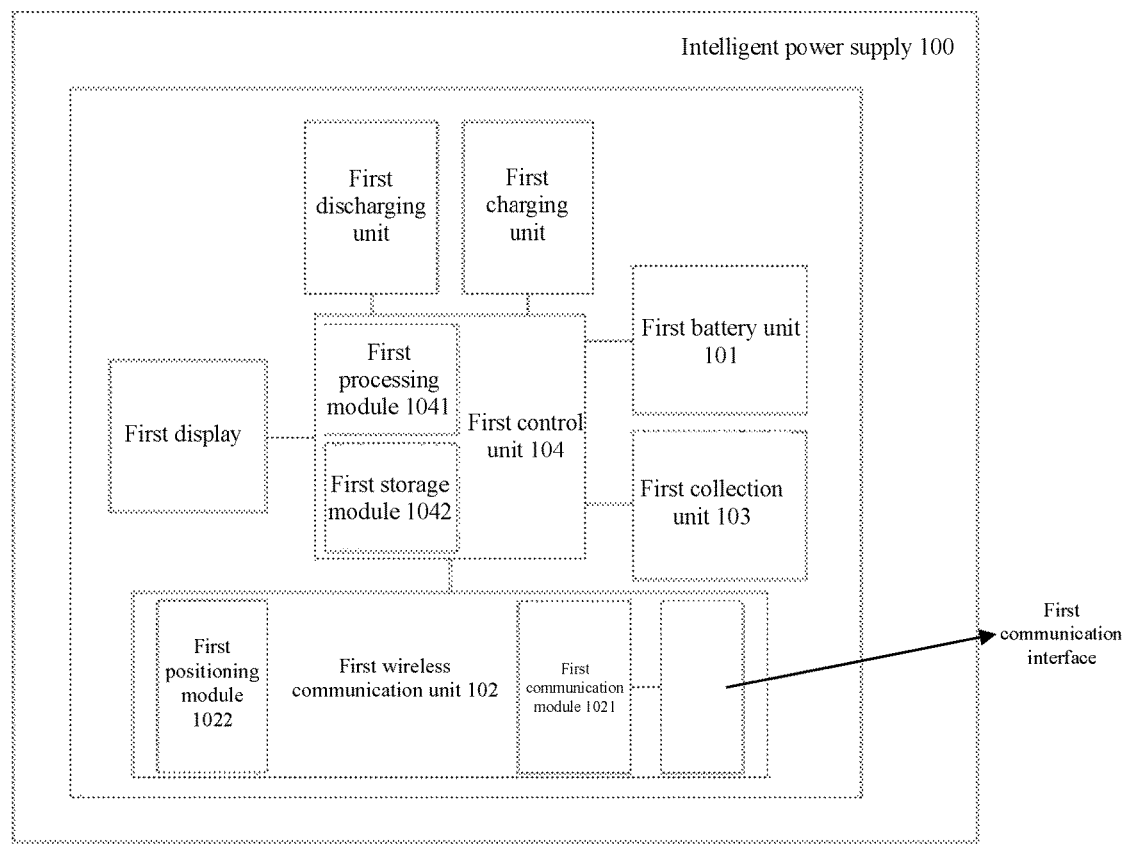
FIG. 9 is a schematic diagram illustrating function modules of an intelligent power supply provided by an embodiment of the present application.

FIG. 9 is a schematic diagram illustrating function modules of an intelligent power supply 100, and the intelligent power supply 100 includes:

a first battery unit 101 configured to supply electric energy to an electrical apparatus 200; and a first wireless communication unit 102 configured to be in wireless communication connection with a mobile communication device, a cloud or an energy storage power supply.

The first battery unit 101 at least includes a battery 10 such as a 21700-type battery (21700 battery for short); and certainly, the first battery unit can also include three 21700 batteries connected in series or five 21700 batteries connected in series to meet the demands of electrical apparatuses of different voltage platforms. It is to be noted that the above descriptions are merely explanations through listing examples and are not limited to the application of the 21700 battery, and other types of batteries such as a 18650-type battery (18650 battery for short) can also be used.

Figures 10A, 10B, 10C:
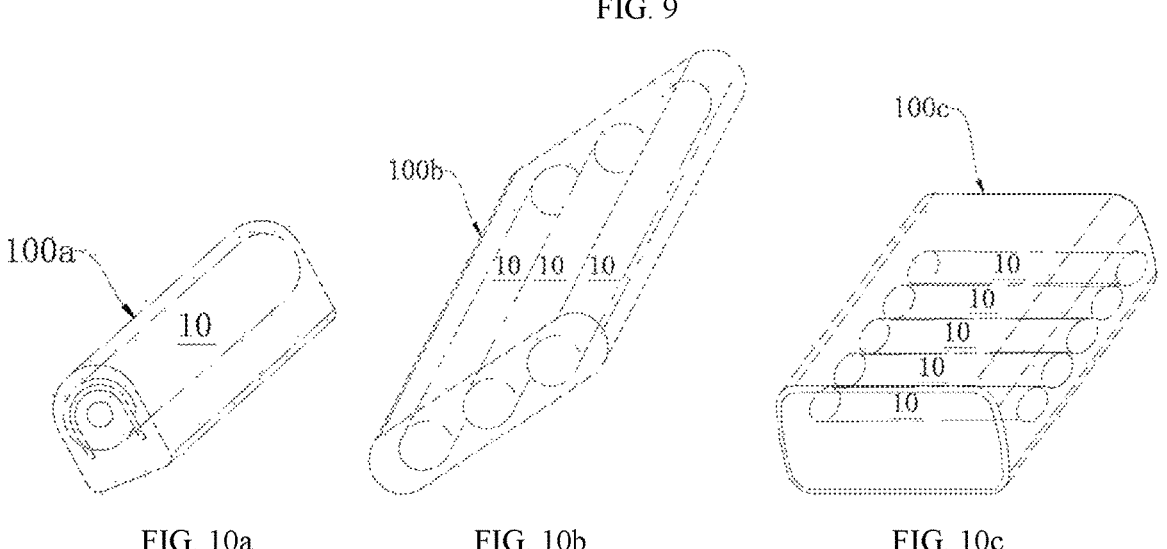
FIG. 10a is a schematic diagram illustrating an intelligent power supply in the form of a single battery provided by an embodiment of the present application.
FIG. 10b is a schematic diagram illustrating an intelligent power supply in the form of three batteries provided by an embodiment of the present application.
FIG. 10c is a schematic diagram illustrating an intelligent power supply in the form of five batteries provided by an embodiment of the present application.
Figures 10D, 10E, 11A, 11B, 11C, 11D:
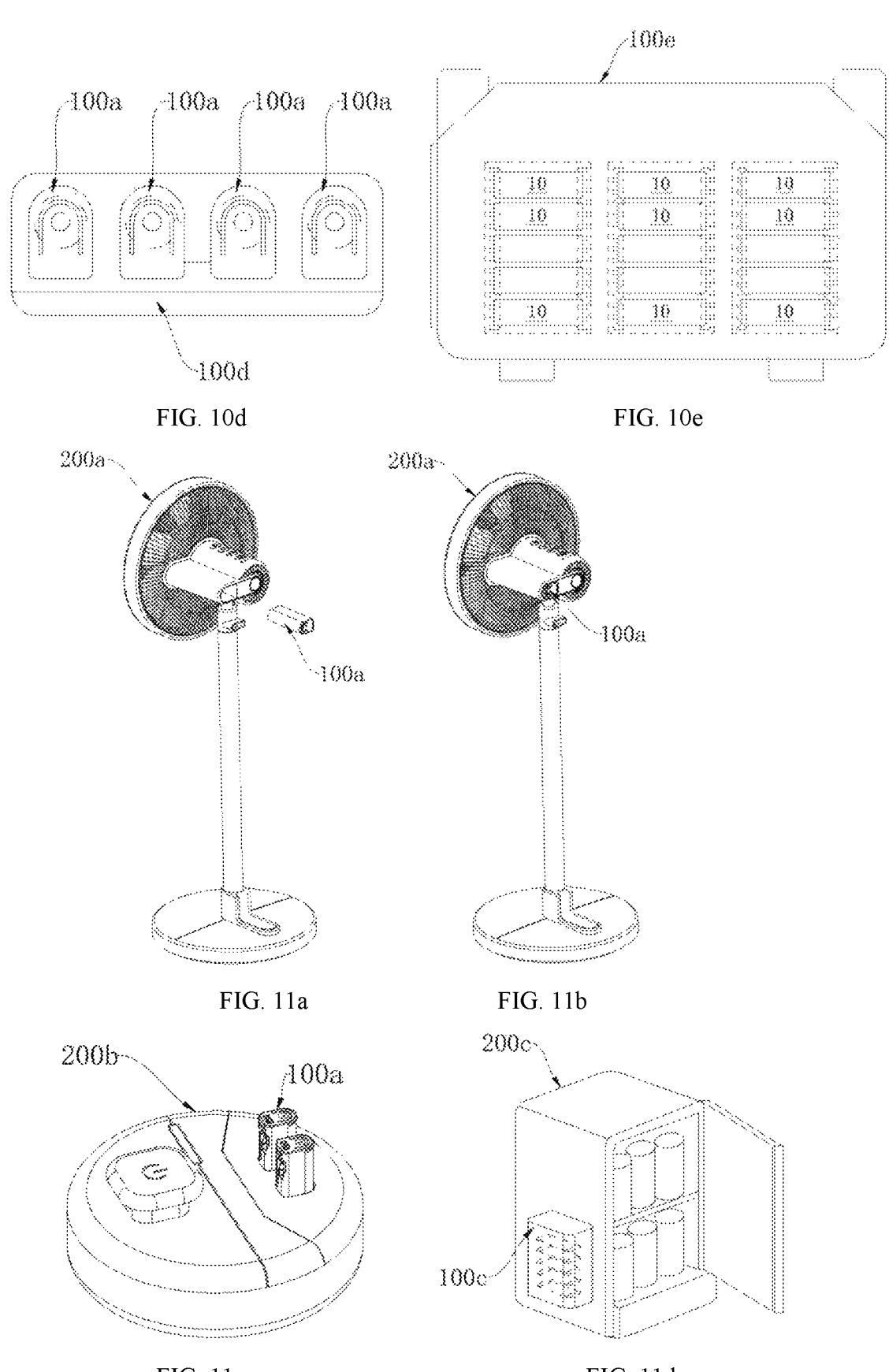
FIG. 10d is a schematic diagram illustrating an intelligent power supply in the form of multiple intelligent power supplies combined with each other, and each of the multiple intelligent power supplies is in the form of a single battery, provided by an embodiment of the present application.
FIG. 10e is a schematic diagram illustrating an intelligent power supply in the form of an energy storage power station provided by an embodiment of the present application.
FIG. 11a is a schematic diagram illustrating an intelligent power supply and an indoor fan to be assembled provided by an embodiment of the present application.
FIG. 11b is a schematic diagram illustrating assembling of an intelligent power supply applicable to an indoor fan provided by an embodiment of the present application.
FIG. 11c is a schematic diagram illustrating assembling of an intelligent power supply applicable to a cleaning robot provided by an embodiment of the present application.
FIG. 11d is a schematic diagram illustrating assembling of an intelligent power supply applicable to an outdoor vehicle-mounted refrigerator provided by an embodiment of the present application.

In addition, the first battery unit can also include at least a group of battery modules; and each battery module is formed by series connection or parallel connection of multiple batteries as an energy storage power supply or energy storage power station 100e, as shown in FIG. 10e.

In addition, the intelligent power supply 100 can be at least formed through series connection or parallel connection of a first intelligent power supply and a second intelligent power supply.

Specifically, the intelligent power supply 100 is in multiple forms, for example:

referring to a schematic diagram as shown in FIG. 10a illustrating an intelligent power supply 100a in the form of a single battery, only one 21700 battery 10 is arranged in the intelligent power supply 100a;

referring to a schematic diagram as shown in FIG. 10b illustrating an intelligent power supply 100b in the form of three batteries, three 21700 batteries 10 connected in series are arranged in the intelligent power supply 100b;

referring to a schematic diagram as shown in FIG. 10c illustrating an intelligent power supply 100c in the form of five batteries, five 21700 batteries 10 connected in series are arranged in the intelligent power supply 100c; and referring to a schematic diagram as shown in FIG. 10d illustrating an intelligent power supply 100d in the form of multiple intelligent power supplies combined with each other (as shown in FIG. 10a), and each of the multiple intelligent power supplies is in the form of a single battery; the intelligent power supply 100d is in the form of four intelligent power supplies 100a connected in series or in parallel as shown in the FIG. 10d, and certainly, the intelligent power supply 100d can also be in the form of multiple intelligent power supplies 100b or multiple intelligent power supplies 100c connected in series or in parallel.

FIG. 10e is a schematic diagram illustrating an intelligent power supply in the form of an energy storage power station, the intelligent power supply includes at least a group of battery modules, each battery module includes multiple batteries 10, and at the moment, the battery unit serves as the energy storage power supply or the energy storage power station.

The electrical apparatus 200 can be an electric tool, the electric tool can be an electric drill, an electric angle grinder, an electric hammer, a sprayer or the like, or can also be an electric gardening tool such as a pruner, a mower, a chain saw or the like, or can be an electric household tool such as a dust collector, a coffee maker, an electric fan or a juicer, or can also be other types of electrical apparatuses such as a glue gun, an air pump, an emergency lamp or the like. In general, the electrical apparatus 200 generally refers to an operating device adopting a secondary battery or battery group (such as the energy storage power supply/energy storage power station) as a power source; and when used, the electrical apparatus 200 needs the intelligent power supply to provide electric energy to drive the electrical apparatus to work.

Figure 11E:
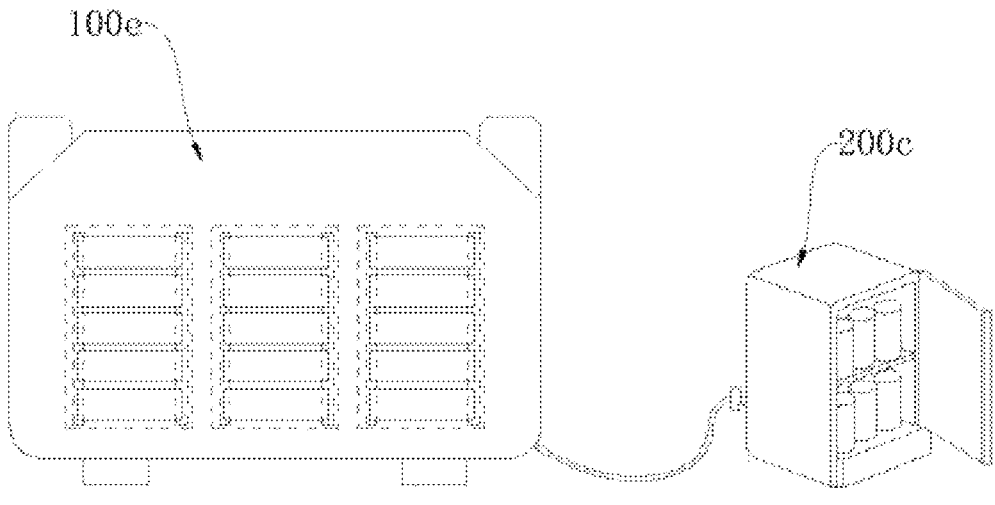
FIG. 11e is a schematic diagram illustrating an intelligent power supply in the form of an energy storage power station applicable to an outdoor vehicle-mounted refrigerator provided by an embodiment of the present application.

The intelligent power supply 100 can be set in the electrical apparatus 200 to supply electric energy to the electrical apparatus; as shown in FIG. 11a and FIG. 11b, the intelligent power supply 100a is detachably arranged on an indoor fan 200a; as shown in FIG. 11c, the intelligent power supply 100b is assembled on and applicable to a cleaning robot 200b; as shown in FIG. 11d, the intelligent power supply 100c is assembled on and applicable to a vehicle-mounted refrigerator 200c; and the intelligent power supply can also be arranged on the electrical apparatus externally, for example, when the intelligent power supply 100a serves as the specific energy storage power supply 100e, the energy storage power supply 100e is arranged externally and supplies electric energy to the vehicle-mounted refrigerator 200c through a power cord or a data cable, as shown in FIG. 11e.

Certainly, preferably, the intelligent power supply 100 can be mounted in a freely detachable manner, that is the intelligent power supply 100 can be detachably mounted on the electrical apparatus 200; at the moment, the intelligent power supply 100 is applicable to different types of electrical apparatuses 200, that is the intelligent power supply 100 can be shared by the electric tool, the electric gardening tool, the en electric household tool.

For example, a user has an intelligent power supply 100 of 3.6V, 12V or 20V which can supply electric energy to the electric drill, the pruner, the dust collector or the emergency lamp, and such the intelligent power supply 100 can meet different usage scenarios of the user.

Preferably, the electrical apparatus can be an outdoor camping device, that is, it is suitable for outdoor camping to provide convenience during outdoor camping of the user.

When the intelligent power supply 100 is mounted and connected to the electrical apparatus 200, the intelligent power supply 100 is suitable for being in mechanical and electrical connection to the electrical apparatus 200, which are fixed through the mechanical connection, and electric energy is supplied to the electrical apparatus 200 through the electrical connection.

The first wireless communication unit 102 at least includes a first communication module 1021; and specifically, the first communication module 1021 is a cellular (such as 2G/3G/4G/5G/NB-IOT/LTE-M) or non-cellular (WiFi/Bluetooth/ZigBee/Lora/Sigfox) communication module, or includes both the cellular and non-cellular communication modules.

For example, the intelligent power supply can be in wireless communication connection with the cloud through the cellular communication module such as the 4G/5G communication module; for another example, the intelligent power supply can be in wireless communication connection with a mobile communication device or an energy storage power supply through the non-cellular communication module such as the WiFi/Bluetooth communication module; and for another example, the intelligent power supply has two communication modules simultaneously, that is the intelligent power supply is in wireless communication connection with the cloud through its own cellular communication module such as the 4G/5G communication module and is also in wireless communication connection with the mobile communication device or the energy storage power supply through its own non-cellular communication module such as the WiFi/Bluetooth communication module to realize information interaction.

Preferably, the first communication module 1021 is a non-cellular communication module to reduce networking cost; and preferably, the first communication module is a Bluetooth communication module.

The first wireless communication unit further includes a first positioning module 1022 for positioning the intelligent power supply, so that a user can conveniently check position information of the intelligent power supply.

In some embodiments, the first positioning module 1022 is a global positioning system (GPS) module or Beidou Satellite module.

As shown in FIG. 9, the intelligent power supply 100 further includes:

a first discharge unit configured to output electric energy to the electrical apparatus to power the electrical apparatus;

a first charging unit configured to charge the first battery unit;

a first collection unit 103 configured to collect various information in real time; and a first control unit 104 configured to control the actuator to execute.

The first collection unit 103 can be a sensor configured to collect various information in real time such as temperature, position or other information; it can also be a collector, for example, a voltage collector is configured to collect a voltage parameter of the intelligent power supply; for another example, a current collector is configured to collect a current parameter of the intelligent power supply; and for another example, a temperature collector is configured to collect a temperature parameter of the intelligent power supply.

In some embodiments, the voltage collector can be one of a shunt, a transformer, a Hall element current sensor or a fiber optic sensor.

In some embodiments, a current collecting method adopted by the current collector can be one of a relay array method, a constant flow source method, an isolation operational amplifier collecting method, a voltage/frequency switching circuit collecting method or a linear optical coupling amplifying circuit collecting method; and preferably, the constant flow source method is adopted.

In some embodiments, a temperature collecting method adopted by the temperature collector can be one of a thermistor collecting method, a thermocouple collecting method, or an integrated temperature sensor collecting method; and preferably, the integrated temperature sensor collecting method is adopted.

The first control unit 104 includes:

a first processing module 1041 configured to process information such as voltage, current, temperature and other status information of the battery, and run a program such as confirming an instruction, forwarding the control instruction, determining whether the information is abnormal, etc.; and a first storage module 1042 configured to store the information and/or the program; or, to store the program, and upload the stored status information to the cloud after the wireless communication unit is connected onto a wireless network.

In some embodiments, the first processing module can also be configured to monitor operating status of the intelligent power supply, that is the first processing module can be configured to compare the current parameter with the previously stored parameter, and/or compare the current parameter with the preset threshold value to carry out monitoring by itself so as to determine whether an abnormity occurs; if yes, the intelligent power supply controls the electrical apparatus to stop working; and at the same time, the first processing module can also be configured to monitor the status of the intelligent power supply during charging, that is monitor the voltage, current, temperature and other parameters of the intelligent power supply during charging.

In some embodiments, the storage module is configured to temporarily store the status information collected by the first collection unit without a wireless network and send the status information temporarily stored in the storage module to the cloud through the first wireless communication unit after the first wireless communication unit is connected to the wireless network; and the storage module can be a FLASH chip, a random dynamic memory or a caching chip, and certainly, it can also be a memory component configured to store data information.

In some embodiments, the intelligent power supply further includes a first communication interface in communication connection with the first control unit. The first control unit can be in two-way/bidirectional communication with the energy storage power supply or the cloud through the first communication interface and can also be in two-way communication with the mobile communication device through the first communication interface. Certainly, the first communication interface is not a necessary component of the intelligent power supply.

In some embodiments, the intelligent power supply further includes a first display; the first display is in communication connection with the first control unit and can display contents (such as temperature, residual capacity, position and other information) and/or an interface (such as an interactive interface) desired by the user as needed. Certainly, the first display is not a necessary component of the intelligent power supply.

Figure 12:
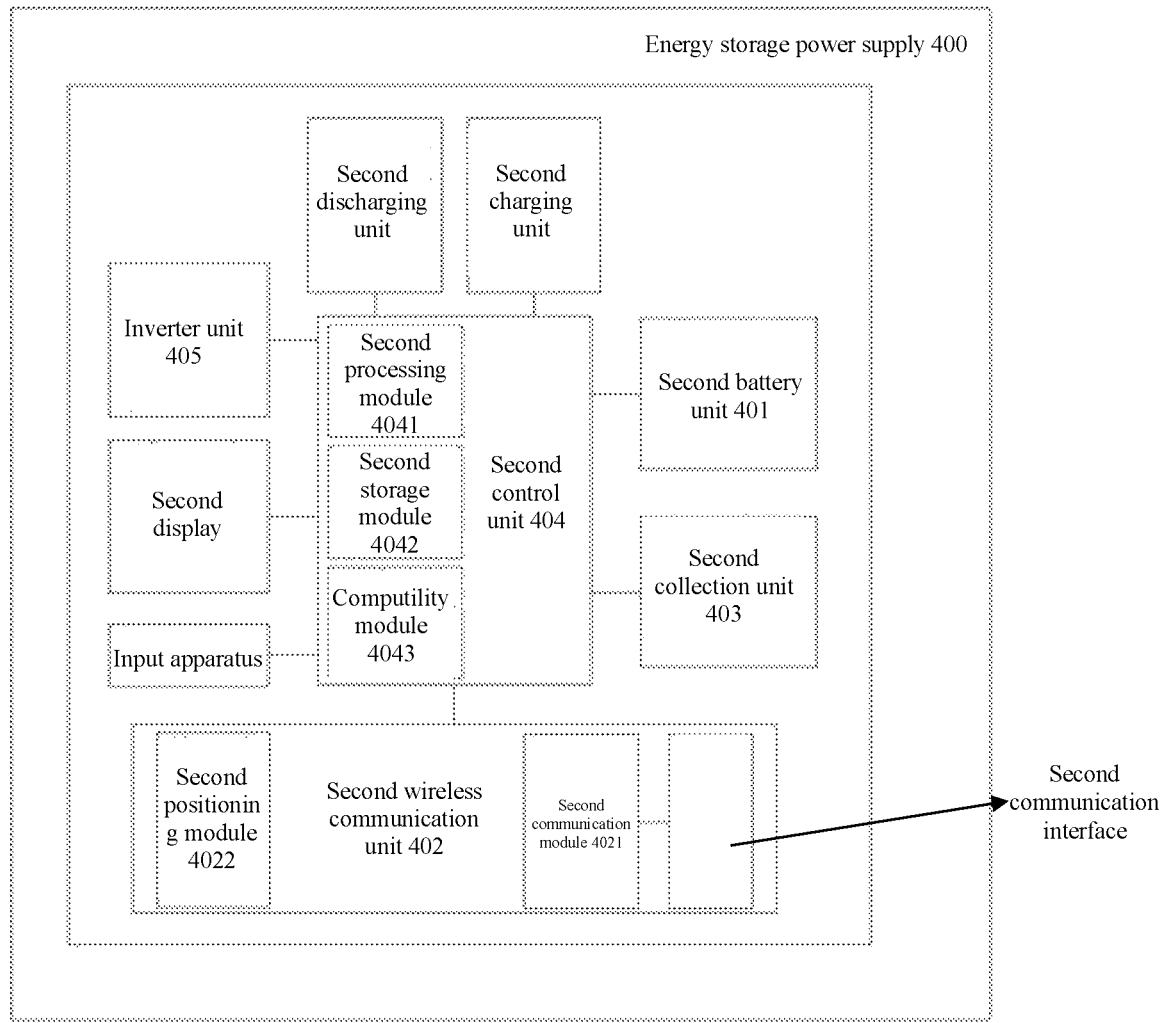
FIG. 12 is a schematic diagram illustrating function modules of an energy storage power supply provided by an embodiment of the present application.

FIG. 12 is a schematic diagram illustrating function modules of an energy storage power supply 400, and the energy storage power supply 400 is in the form of an energy storage power station and the energy storage power supply 400 includes:

a second battery unit 401;

a second wireless communication unit 402 configured to be in wireless communication connection with a cloud or a mobile communication device; and an inverter unit 405 configured to transform a direct current outputted by the second battery unit into an alternating current to output the alternating current and the direct current so as to meet power consuming demands of different electrical apparatuses.

The second battery unit 401 at least includes a group of battery modules; each battery module includes multiple batteries 10 connected in series or in parallel; and each battery 10 can be a 21700 battery or other types of batteries such as a 18650 battery.

The second wireless communication unit 402 at least includes a group of second communication modules 4021; each of the second communication modules 4021 can be a cellular (such as 2G/3G/4G/5G/NB-IOT/LTE-M) or non-cellular (such as WiFi/Bluetooth/ZigBee/Lora/Sigfox) communication module; or the second wireless communication unit 402 includes two groups of second communication modules, that is the second wireless communication unit 402 includes both the cellular communication module and the non-cellular communication module.

Specifically, the energy storage power supply is in wireless communication connection with the cloud through its own cellular communication module such as a 4G/5G communication module; for another example, the energy storage power supply is in wireless communication connection with a mobile communication device through its own non-cellular communication module such as a WiFi/Bluetooth communication module; and for another example, the energy storage power supply has an own cellular communication module and an own non-cellular communication module simultaneously, that is the energy storage power supply is in wireless communication connection with the mobile communication device through the own non-cellular communication module such as the WiFi/Bluetooth communication module, and is also in wireless communication connection with the cloud through the own cellular communication module such as the 4G/5G communication module.

The second wireless communication unit 402 further includes a second positioning module 4022 for positioning position information of the energy storage power supply; and in some embodiments, the second positioning module 4022 is a GPS module or a Beidou Satellite module.

As shown in FIG. 12, the energy storage power supply 400 further includes:

a second discharge unit configured to output electric energy;

a second charging unit configured to charge the second battery unit;

a second collection unit 403 configured to collect status information of the energy storage power supply in real time; and a second control unit 404 configured to process various information and run a program.

The second discharge unit includes a direct current (DC) discharge module and an alternating current (AC) discharge module which have DC and AC outputting functions respectively; the second discharge unit also includes a car cigarette lighter (car charging port) and a power delivery (PD) two-way charging and discharge port; and the second charging unit includes a utility power charging port, a solar panel charging port, etc.

In some embodiments, the second collection unit 403 is configured to collect the status information of the energy storage power supply in real time such as voltage, current, temperature and other status information; the second collection unit 403 can be a sensor configured to collect various information in real time such as temperature, position and other information; and the second collection unit can also be a collector, for example, a voltage collector is adopted and is configured to collect a voltage parameter of the energy storage power supply; for another example, a current collector is adopted and is configured to collect a current parameter of the energy storage power supply; and for another example, a temperature collector is adopted and is configured to collect a temperature parameter of the energy storage power supply.

In some embodiments, the voltage collector can be one of a shunt, a transformer, a Hall element current sensor or a fiber optic sensor.

In some embodiments, a current collecting method adopted by the current collector can be one of a relay array method, a constant flow source method, an isolation operational amplifier collecting method, a voltage/frequency switching circuit collecting method or a linear optical coupling amplifying circuit collecting method; and preferably, the constant flow source method is adopted.

In some embodiments, a temperature collecting method adopted by the temperature collector can be one of a thermistor collecting method, a thermocouple collecting method, or an integrated temperature sensor collecting method; and preferably, the integrated temperature sensor collecting method is adopted.

The second control unit 404 at least includes:

a second processing module 4041 configured to process information, such as collected status information including voltage, current, temperature and other status information, and run a program, such as forwarding and determining an instruction; and a second storage module 4042 configured to store the information and/or the program, such as the status information of the energy storage power supply, and a pre-stored executive program.

In some embodiments, the second control unit further includes a computility module 4043; the computility module

Figure 13A:
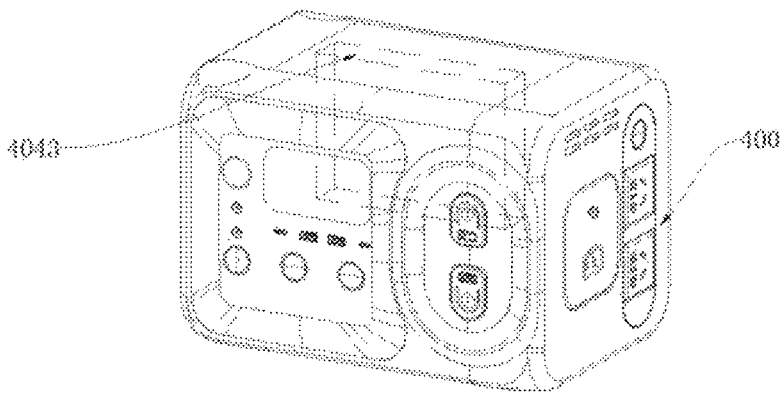
FIG. 13a is a structural diagram illustrating a computility module embedded in an energy storage power supply provided by an embodiment of the present application.
Figure 13B:
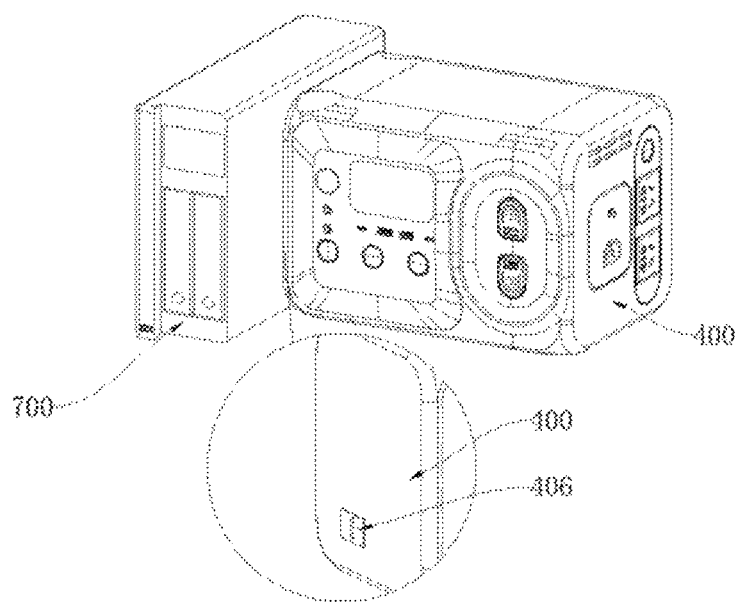
FIG. 13b is a structural diagram illustrating connection of a computility device and an energy storage power supply provided by an embodiment of the present application.

4043 can be configured to generate a program; specifically, when a user inputs a triggering condition and executing action, the computility module 4043 can generate a corresponding executive program according to the triggering condition and the executing action; the computility module 4043 can be embedded in the energy storage power supply as shown in FIG. 13*a*; the computility module 4043 can also be arranged outside the energy storage power supply, that is the computility module 4043 and the storage module form a computility device 700; the computility device 700 is arranged outside the energy storage power supply 400; a port 406 is formed in the energy storage power supply 400; a plug electrically connected with the port is arranged on the computility device; and when the computility device is connected to the energy storage power supply, the plug is inserted into the port to realize electric connection and communication connection between them, as shown in FIG. 13*b*.

As shown in FIG. 12, the energy storage power supply further includes:

an input apparatus configured for a user to input instruction information; the input apparatus is in communication with the second control unit.

In some embodiments, the input apparatus can be a human-computer interaction unit; an interactive mode of the human-computer interaction unit can be one or more of voice, gesture, eye contact, facial expression and other natural interactive modes, and can also be realized by adopting physiological data such as brain electricity, myo-electricity and dermal electricity; and preferably, the human-computer interaction unit is a voice collector or a camera.

In some embodiments, the input apparatus can also be configured to input the triggering condition and the executing action to cooperate with the computility module.

In some embodiments, the energy storage power supply further includes a second display; the second display is in communication connection with the second control unit and can display contents (such as temperature, residual capacity, position and other information) and/or an interface (such as an interactive interface) desired by the user as needed. Certainly, the second display is not a necessary component of the energy storage power supply.

Figure 14:
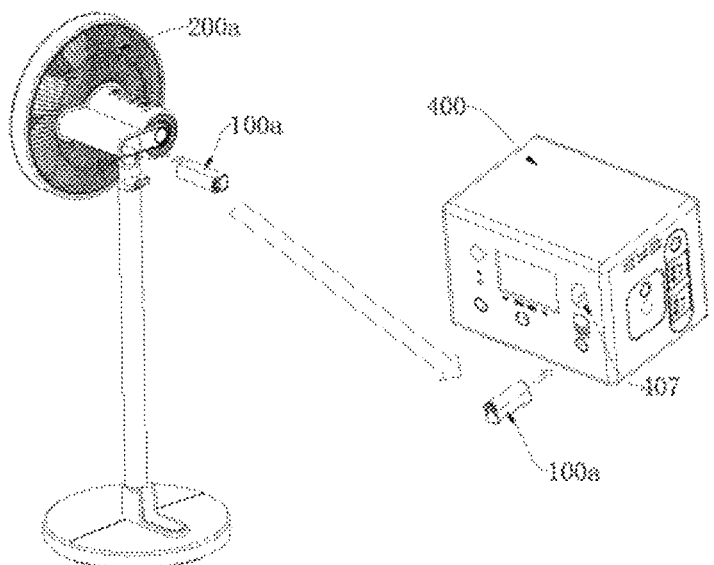
FIG. 14 is a schematic diagram illustrating insertion of an intelligent power supply into an energy storage power supply after being taking off an electrical apparatus provided by an embodiment of the present application.

The energy storage power supply 400 is also suitable for supplying electric energy to the intelligent power supply 100 of the intelligent terminal, that is when the electric quantity of the intelligent power supply 100 is insufficient, a user can use the energy storage power supply 400 to supply electric energy to the intelligent power supply 100; specifically, a mounting part 407 is arranged on the energy storage power supply 400, so that the intelligent power supply can be mounted in the mounting part 407 of the energy storage power supply, so that the energy storage power supply can power the intelligent power supply; and for example, in FIG. 14, when the electric quantity of an intelligent power supply 100*a* of a fan is insufficient, the intelligent power supply 100*a* is pulled out of the fan 200*a* and inserted in the mounting part 407 of the energy storage power supply 400, so that the energy storage power supply 400 can supply electric energy to the intelligent power supply 100*a*.

Preferably, the capacity (Ah) of the energy storage power supply 400 is greater than that of the intelligent power supply 100.

Figure 15A:
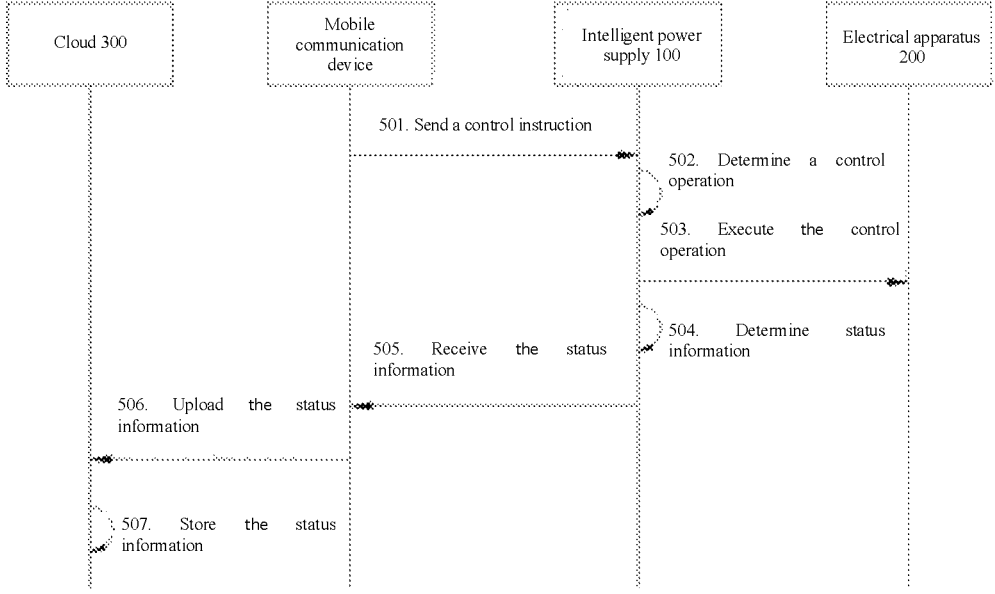
FIG. 15a is a flowchart illustrating multi-interaction of a control method for controlling an electrical apparatus provided by an embodiment of the present application.

FIG. 15*a* is a flowchart illustrating multi-interaction of a control method of an electrical apparatus shown in an exemplary embodiment of the present application. Specific steps of the control method will be described in detail according to FIG. 15*a*.

S501: a mobile communication device sends a control instruction to the intelligent power supply.

When a user uses the intelligent power supply to control the electrical apparatus for the first time, the user needs to register and fill in necessary user information online. Certainly, the user can download a user terminal application suitable for the intelligent power supply to the mobile communication device from a cloud through a network, and locally install the application to the mobile communication device; or the user terminal application suitable for the intelligent power supply has been installed on the mobile communication device of the user in advance. The user terminal application on the mobile communication device is started through logging in a user account, and the mobile communication device is in connection with the intelligent power supply. After connection with the cloud is established, the user can input the control instruction, such as a power supply starting instruction, in the mobile communication device. The mobile communication device realizes wireless communication connection with the intelligent power supply 100 to send the power supply starting instruction input by the user to the intelligent power supply.

S502: the intelligent power supply 100 determines a corresponding control operation according to the received control instruction.

S503: the intelligent power supply 100 executes the control operation to control the electrical apparatus 200.

The intelligent power supply 100 can identify the power supply starting instruction to determine a corresponding control operation as turning on an electric fan, and drives its battery to power the electric fan connected with the intelligent power supply according to the identified power supply starting instruction.

S504: the intelligent power supply 100 determines status information of its battery.

The intelligent power supply 100 can collect current, voltage, temperature and other status information of a battery unit in real time through its own first collection unit 103.

S505: the intelligent power supply 100 sends the determined status information to the mobile communication device.

S506: the mobile communication device uploads the received status information to the cloud 300.

S507: the cloud 300 stores the received status information.

After determining the status information of its battery, the intelligent power supply 100 can send the status information to the mobile communication device through its own wireless communication unit, and the mobile communication device uploads the status information to the cloud 300, so that the cloud 300 can store the status information of the battery in the intelligent power supply 100.

Figure 15B:
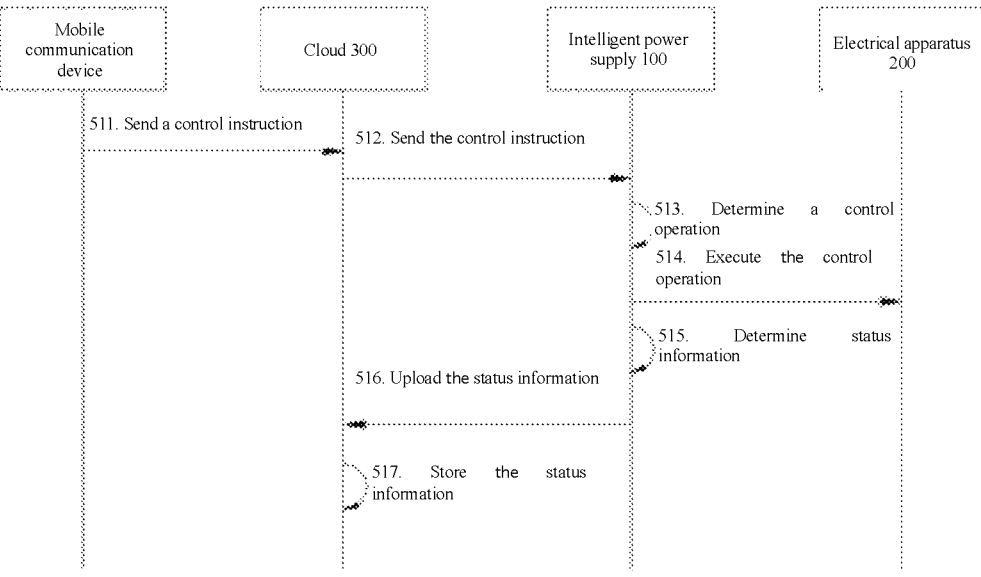
FIG. 15b is a flowchart illustrating multi-interaction of another control method for controlling an electrical apparatus provided by an embodiment of the present application; and at the moment, an instruction is forwarded through a cloud.

FIG. 15b is a flowchart illustrating multi-interaction of another control method of an electrical apparatus shown in another exemplary embodiment of the present application, and a control instruction is forwarded through a cloud. Specific steps of the control method will be described in detail according to FIG. 15b.

S511: a mobile communication device sends a control instruction to the cloud.

When a user uses an intelligent power supply to control the electrical apparatus for the first time, the user needs to register and fill in necessary user information online. Certainly, the user can download a user terminal application suitable for the intelligent power supply to the mobile communication device from the cloud through a network, and locally installs the application to the mobile communication device; or the user terminal application suitable for the intelligent power supply has been installed on the mobile communication device of the user in advance. The user terminal application on the mobile communication device is started through logging in a user account, and the mobile communication device is in connection with the cloud. After connection with the cloud is established, the user can input the control instruction, such as a power supply starting instruction, in the mobile communication device. The mobile communication device realizes wireless communication connection with the cloud 300 through cellular data such as 4G or 5G signals to send the power supply starting instruction input by the user to the cloud.

S512: the cloud 300 sends the received control instruction to the intelligent power supply 100.

After receiving the power supply starting instruction sent by the mobile communication device, the cloud can forward the instruction to the intelligent power supply 100 connected to it.

S513: the intelligent power supply 100 determines a corresponding control operation according to the received control instruction.

S514: the intelligent power supply 100 executes the control operation to control the electrical apparatus 200.

The intelligent power supply 100 can identify the power supply starting instruction to determine the corresponding control operation as turning on an electric fan, and drives its battery to power the electric fan connected with the intelligent power supply according to the identified power supply starting instruction.

S515: the intelligent power supply 100 determines status information of its battery.

The intelligent power supply 100 can collect current, voltage, temperature and other status information of a battery unit in real time through its own first collection unit 103.

S516: the intelligent power supply 100 sends the determined status information to the cloud 300.

S517: the cloud 300 stores the received status information.

After determining the status information of its battery, the intelligent power supply 100 can send the status information to the cloud 300 through its own wireless communication unit, so that the cloud 300 can store the status information of the battery in the intelligent power supply 100.

Figure 15C:
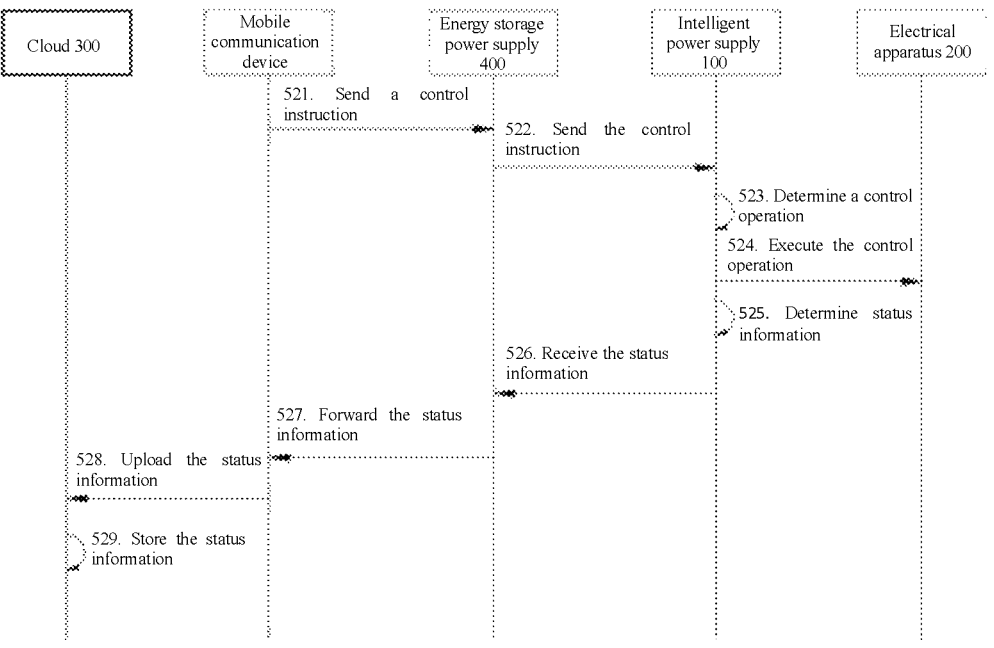
FIG. 15c is a flowchart illustrating multi-interaction of another control method for controlling an electrical apparatus provided by an embodiment of the present application; and at the moment, an instruction is forwarded through an energy storage power suppl.

FIG. 15c is a flowchart illustrating multi-interaction of another control method of an electrical apparatus shown in another exemplary embodiment of the present application, and an energy storage power supply is configured to forward an instruction. Specific steps of the control method will be described in detail according to FIG. 15c.

S521: a mobile communication device sends a control instruction to the energy storage power supply.

When a user uses an intelligent power supply to control the electrical apparatus for the first time, the user needs to register and fill in necessary user information online. Certainly, the user can download a user terminal application suitable for the intelligent power supply to the mobile communication device from a cloud through a network, and locally installs the application to the mobile communication device; or the user terminal application suitable for the intelligent power supply has been installed on the mobile communication device of the user in advance. The user terminal application on the mobile communication device is started through logging in a user account, and the mobile communication device is in connection with the intelligent power supply. After connection with the cloud is established, the user can input the control instruction, such as a power supply starting instruction, in the mobile communication device. The mobile communication device is in wireless communication connection with the energy storage power supply 400 to send the power supply starting instruction input by the user to the energy storage power supply.

S522: the energy storage power supply 400 forwards the received control instruction to the intelligent power supply 100.

After receiving the power supply starting instruction sent by the mobile communication device, the energy storage power supply 400 can forward the instruction to the intelligent power supply 100 connected to it.

S523: the intelligent power supply 100 determines a corresponding control operation according to the received control instruction.

S524: the intelligent power supply 100 executes the control operation to control the electrical apparatus 200.

The intelligent power supply 100 can identify the power supply starting instruction to determine the corresponding control operation as turning on an electric fan, and drives its battery to power the electric fan connected with the intelligent power supply according to the identified power supply starting instruction.

S525: the intelligent power supply 100 determines status information of its battery.

The intelligent power supply 100 can collect current, voltage, temperature and other status information of a battery unit in real time through its own first collection unit 103.

S526: the intelligent power supply 100 sends the determined status information to the energy storage power supply 400.

S527: the energy storage power supply 400 forwards the status information to the mobile communication device.

S528: the mobile communication device uploads the received status information to a cloud 300.

S529: the cloud 300 stores the received status information.

After determining the status information of its battery, the intelligent power supply 100 can send the status information to the energy storage power supply through its own wireless communication unit, the energy storage power supply forwards the status information to the mobile communication device, and the mobile communication device uploads the status information to the cloud 300, so that the cloud 300 can store the status information of the battery in the intelligent power supply 100.

Figure 15D:
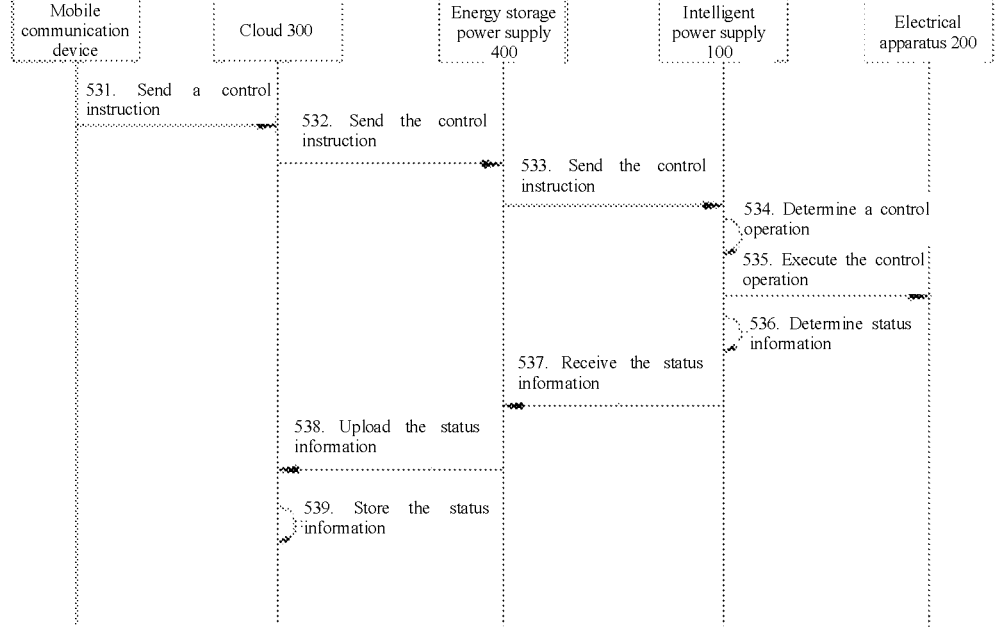
FIG. 15d is a flowchart illustrating multi-interaction of another control method for controlling an electrical apparatus provided by an embodiment of the present application; and at the moment, an instruction is forwarded through a cloud an energy storage power supply.

FIG. 15*d* is a flowchart illustrating multi-interaction of another control method of an electrical apparatus shown in another exemplary embodiment of the present application, and instruction information is forwarded through a cloud and an energy storage power supply. Specific steps of the control method will be described in detail according to FIG. 15*d*.

S531: a mobile communication device sends a control instruction to the cloud.

When a user uses an intelligent power supply to control the electrical apparatus for the first time, the user needs to register and fill in necessary user information online. Certainly, the user can download a user terminal application suitable for the intelligent power supply to the mobile communication device from the cloud through a network, and locally installs the application to the mobile communication device; or the user terminal application suitable for the intelligent power supply has been installed on the mobile communication device of the user in advance. The user terminal application on the mobile communication device is started through logging in a user account, and the mobile communication device is in connection with the cloud. After connection with the cloud is established, the user can input the control instruction, such as the power supply starting instruction, in the mobile communication device. The mobile communication device is in wireless communication connection with the cloud 300 through cellular data such as 4G or 5G signals to send the power supply starting instruction input by the user to the cloud.

S532: the cloud 300 sends the received control instruction to the energy storage power supply 400.

After receiving the power supply starting instruction sent by the mobile communication device, the cloud can forward the instruction to the energy storage power supply 400 connected to it.

S533: the energy storage power supply 400 forwards the received control instruction to the intelligent power supply 100.

S534: the intelligent power supply 100 determines a corresponding control operation according to the received control instruction.

S535: the intelligent power supply 100 executes the control operation to control the electrical apparatus 200.

The intelligent power supply 100 can identify the power supply starting instruction to determine the corresponding control operation as turning on an electric fan, and drives its battery to power the electric fan connected with the intelligent power supply according to the identified power supply starting instruction.

S536: the intelligent power supply 100 determines status information of its battery.

The intelligent power supply 100 can collect current, voltage, temperature and other status information of a battery unit in real time through its own first collection unit 103.

S537: the intelligent power supply 100 sends the determined status information to the energy storage power supply 400.

S538: the energy storage power supply 400 uploads the status information to the cloud 300.

S539: the cloud 300 stores the received status information.

After determining the status information of its battery, the intelligent power supply 100 can send the status information to the energy storage power supply through its own wireless communication unit, and the energy storage power supply uploads the status information to the cloud 300, so that the cloud 300 can store the status information of the battery in the intelligent power supply 100.

The above descriptions are only preferred embodiments of the present application, and are not intended to limit the present application. Any modifications, equivalent replacements, improvements etc. made within the spirit and principle of the present application shall be included in the protection scope of the present application.

What is claimed is:

1. A control system for controlling an electrical apparatus, characterized in that the control system, applicable to an outdoor environment, comprises: a mobile communication device, an energy storage power supply, an intelligent power supply, an electrical apparatus, and a cloud;

wherein the mobile communication device is in wireless communication connection with the cloud; and the cloud is in wireless communication connection with the energy storage power supply; the mobile communication device is in wireless communication connection with the energy storage power supply; the energy storage power supply is in wireless communication connection with the intelligent power supply; and the intelligent power supply is configured to supply electric energy to the electrical apparatus;

wherein the mobile communication device is configured to receive a control instruction for controlling the electrical apparatus input by a user;

the energy storage power supply is configured to forward the control instruction;

the intelligent power supply is configured to receive the control instruction forwarded by the energy storage power supply and control the electrical apparatus according to the control instruction; and the intelligent power supply is connected to the energy storage power supply through a non-cellular communication module, the energy storage power supply is further configured with a cellular communication module, and the energy storage power supply is connected to the cloud through the cellular communication module, so as to allow the intelligent power supply to control the electrical apparatus in the outdoor environment.

2. The control system for controlling an electrical apparatus of claim 1, wherein the cloud is configured to forward the control instruction.

3. The control system for controlling an electrical apparatus of claim 1, wherein the control system further comprises a mobile wireless fidelity (WiFi) device; and the mobile WiFi device is configured to provide a WiFi network for the mobile communication device and the energy storage power supply.

4. The control system for controlling an electrical apparatus of claim 1, wherein the intelligent power supply comprises:

a first battery unit configured to supply electric energy to the electrical apparatus;

a first wireless communication unit configured to realize wireless communication with the energy storage power supply; and a first control unit configured to receive the control instruction sent by the energy storage power supply through the first wireless communication unit, and execute a corresponding control operation on the electrical apparatus according to the control instruction.

5. The control system for controlling an electrical apparatus of claim 4, wherein the intelligent power supply executes the control instruction to realize the corresponding control operation on the electrical apparatus; or the intelligent power supply sends the control instruction to the electrical apparatus, and the electrical apparatus executes the control instruction to realize the corresponding control operation.

6. The control system for controlling an electrical apparatus of claim 4, wherein the control instruction comprises a power supply starting instruction; and the first control unit is configured to drive the first battery unit to start the electrical apparatus according to the power supply starting instruction; and/or the control instruction comprises a power supply shutoff instruction; and the first control unit is configured to drive the first battery unit to shut off the electrical apparatus according to the power supply shutoff instruction.

7. The control system for controlling an electrical apparatus of claim 4, wherein the control instruction comprises a parameter adjusting instruction; and the first control unit is configured to adjust an output parameter of the first battery unit according to the parameter adjusting instruction.

8. The control system for controlling an electrical apparatus of claim 1, wherein there are multiple intelligent power supplies, and the energy storage power supply is in wireless communication with the multiple intelligent power supplies simultaneously.

9. The control system for controlling an electrical apparatus of claim 1, wherein there are multiple intelligent power supplies, and at least one intelligent power supply of the multiple intelligent power supplies is configured to forward the control instruction for controlling another intelligent power supply.

10. A control method for controlling an electrical apparatus, characterized in that the control method is applied to the energy storage power supply in the control system for controlling an electrical apparatus according to claim 1, and comprises:

receiving a control instruction sent by the mobile communication device through wireless communication connection; and sending the control instruction to the intelligent power supply to enable the intelligent power supply to control the electrical apparatus according to the control instruction.

* * * * *